(12) United States Patent
Lewis et al.

(10) Patent No.: US 9,230,414 B2
(45) Date of Patent: Jan. 5, 2016

(54) AUTOMATED BANKING MACHINE WITH AUDIO JACK

(71) Applicant: Diebold Self-Service Systems, division of Diebold, Incorporated, North Canton, OH (US)

(72) Inventors: David N. Lewis, Canal Fulton, OH (US); Gregory S. Ray, North Canton, OH (US); Tim Crews, Alliance, OH (US); Bruce Bowen, Chepachet, RI (US); Lee Kravitz, Ellicott City, MD (US); James Trocme, McLean, VA (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 14/193,925

(22) Filed: Feb. 28, 2014

(65) Prior Publication Data

US 2014/0239063 A1    Aug. 28, 2014

Related U.S. Application Data

(60) Provisional application No. 61/851,031, filed on Feb. 28, 2013.

(51) Int. Cl.
*G06K 5/00* (2006.01)
*G07F 19/00* (2006.01)
*G09B 21/00* (2006.01)

(52) U.S. Cl.
CPC ............ *G07F 19/201* (2013.01); *G07F 19/205* (2013.01); *G09B 21/006* (2013.01)

(58) Field of Classification Search
CPC .......................... G06Q 20/1085; G06Q 20/18
USPC ......................................... 235/379, 380, 383
See application file for complete search history.

(56) References Cited

U.S. PATENT DOCUMENTS

| | | | |
|---|---|---|---|
| 7,431,204 B1 * | 10/2008 | Block et al. .................... | 235/379 |
| 7,513,414 B1 * | 4/2009 | Block et al. .................... | 235/379 |
| 7,870,996 B1 * | 1/2011 | Graef et al. .................... | 235/379 |
| 8,651,371 B1 | 2/2014 | Smith | |

* cited by examiner

*Primary Examiner* — Daniel St Cyr
(74) *Attorney, Agent, or Firm* — Black McCuskey Souers & Arbaugh, LPA

(57) ABSTRACT

In accordance with an example embodiment, there is disclosed herein an externally accessible headphone jack that is suitable for use with an automated banking machine such as an ATM. The headphone jack is configured to be releasably, electrically connectable to portable audio output devices. The headphone jack includes an opening external of the machine that is configured to receive electrical connector plugs therein. A jack housing is located within the automated banking machine, wherein the jack housing extends below the opening and bounds an interior area, wherein the interior area houses at least one electrical contact configured for releasable electrical connection with electrical connector plugs. The jack housing includes a drain opening therein below the at least one electrical contact that is configured to drain water from the interior area of the jack housing.

17 Claims, 15 Drawing Sheets

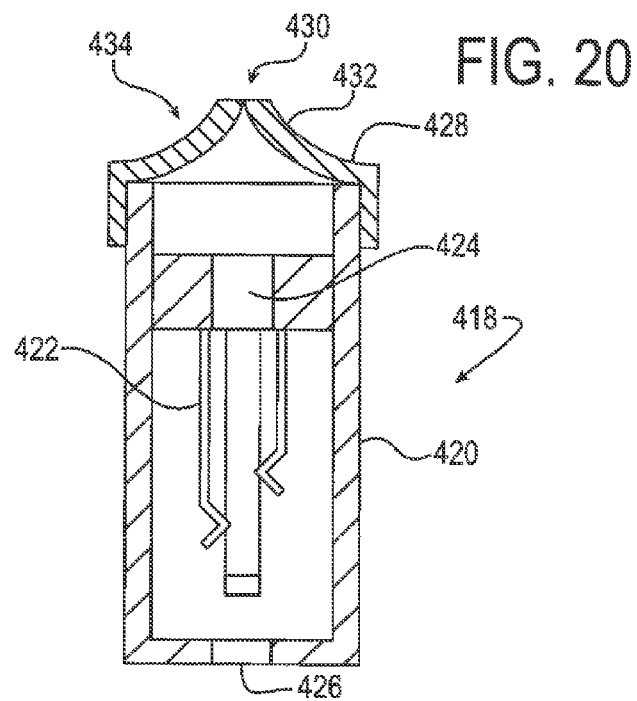
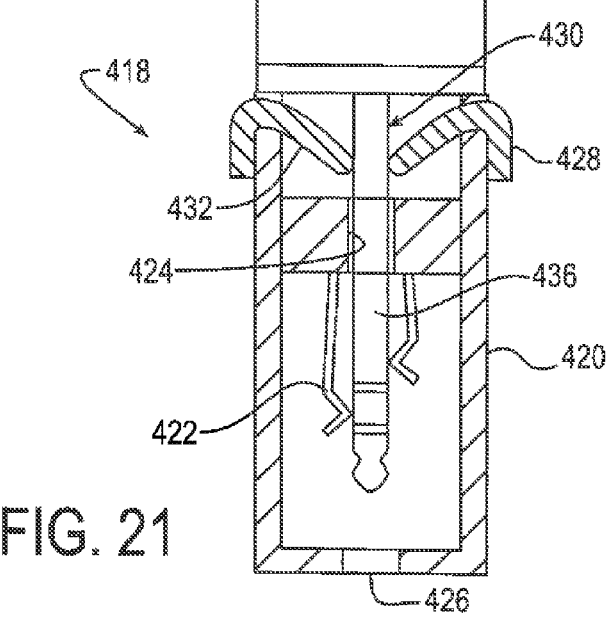

AUTOMATED BANKING MACHINE WITH AUDIO JACK

CROSS REFERENCE TO RELATED APPLICATIONS

This application claims the benefit under 35 U.S.C. §119(e) of U.S. Provisional Application No. 61/851,031, filed Feb. 28, 2013.

TECHNICAL FIELD

This disclosure relates to automated banking machines.

BACKGROUND

Automated banking machines are well known. A common type of automated banking machine used by consumers is an automated teller machine. Automated banking machines enable customers to carry out banking transactions. Common banking transactions that may be carried out with automated banking machines include the dispensing of cash, the receipt of deposits, the transfer of funds between accounts, the payment of bills and account balance inquiries. The type of banking transactions a customer can carry out are determined by capabilities of the particular automated banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks food stamps, money orders, scrip or travelers' checks. For purposes of this disclosure, references to an automated teller machine (ATM), an automated banking machine or automated transaction machine shall encompass any device which carries out automated transactions including transfers of value.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an externally accessible headphone jack that is suitable for use with an automated banking machine such as an ATM. The headphone jack is configured to be releasably, electrically connectable to portable audio output devices. The headphone jack includes an opening external of the machine that is configured to receive electrical connector plugs therein. A jack housing is located within the automated banking machine, wherein the jack housing extends below the opening and bounds an interior area, wherein the interior area houses at least one electrical contact configured for releasable electrical connection with electrical connector plugs. The jack housing includes a drain opening therein below the at least one electrical contact that is configured to drain water from the interior area of the jack housing.

In accordance with an example embodiment, there is disclosed herein an apparatus comprising an automated banking machine that operates to cause financial transfers. The machine includes a reader operable to obtain data corresponding to financial accounts, a display, an input device, a sheet handling device, and an externally accessible headphone jack that is configured to be releasably, electrically connectable to portable audio output devices. A computer is associated with the machine. The sheet handling device is operable to one of a group consisting of dispense sheets to machine users, receive sheets from machine users, and both dispense sheets to machine users and receive sheets from machine users. The computer is operable to cause a determination that data read by the reader corresponds to an account authorized to conduct a transaction through operation of the automated banking machine. The computer is further operable to cause a financial transfer from one of a group consisting of to the account, from the account, and both to the account and from the account responsive at least in part to the determination that data read by the card reader corresponds to an account authorized to conduct a transaction through operation of the automated banking machine. The headphone jack includes an opening external of the machine that is configured to receive electrical connector plugs therein. A jack housing is located within the automated banking machine, wherein the jack housing extends below the opening and bounds an interior area, wherein the interior area houses at least one electrical contact configured for releasable electrical connection with electrical connector plugs. The jack housing includes a drain opening therein below the at least one electrical contact. The drain opening is configured to drain water from the interior area of the jack housing.

BRIEF DESCRIPTION OF DRAWINGS

FIG. 20 is an alternative example of a headphone jack that includes a flexible resilient cover for minimizing the introduction of moisture and other contaminants into the headphone jack.

FIG. 21 is a view of the headphone jack shown in FIG. 20 with an electrical connector plug shown therein.

DESCRIPTION OF EXAMPLE EMBODIMENTS

Figure 1:
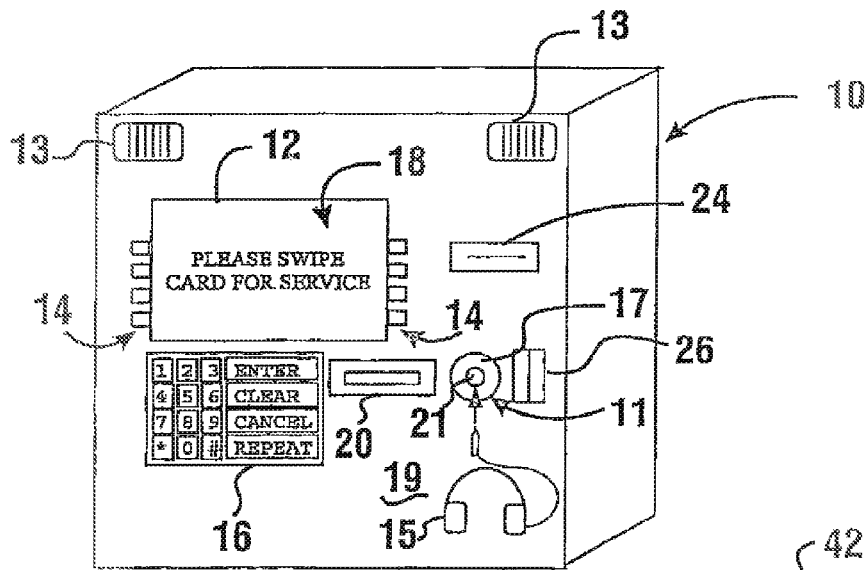
FIG. 1 is a perspective view representative of an example embodiment of an automated banking machine.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring now to the drawings and particularly to FIG. 1, there is shown therein a perspective view of an example automated banking machine such as an automated teller machine 10. The example embodiment of the automated banking machine 10 includes output devices such as a display device 12 and external loudspeakers 13. The display device 12 is operable to provide a consumer with a user interface 18 that includes a plurality of screens or other outputs including selectable options for operating the machine. The external loudspeakers 13 may be operable to provide a consumer with audible music, beeps, signals, and/or verbal instructions for operating the machine.

In an example embodiment, the automated banking machine 10 may further include at least one output device such as an external port 11. The external port provides signals corresponding to audible or other machine outputs. In the example embodiment of the automated banking machine 10, the external port 11 includes a speaker port such as a headphone port 21 for operably connecting portable speaker devices such as a set of headphones 15 to the automated banking machine. In other example embodiments, the external port 11 may comprise a wireless connection port. For example, in an alternative example embodiment of the automated banking machine 10, the external port 11 may include a wireless communication device which is operable to communicate with a wireless headphone set or other external device capable of providing audible, visual or other user perceivable outputs. Such wireless communication devices may communicate with the external device using RF or IR signals, for example. The portable device that can be operably connected through the port may include a portable device such as a smart phone.

In the example embodiment, the external port 11 may include a base 17 with a useful shape that is not flush with the fascia 19 of the automated banking machine 10. The shape of the base 17 may have a distinctive contour which enables a consumer with impaired vision to quickly locate the external port by touching the fascia 19 and base 17 of the automated banking machine. For example, in one example embodiment, the base of the external port may include a concave portion with a female headphone jack or port 21 positioned generally in the center of the concave portion. In further example embodiments, the base 17 of the external jack may extend from the fascia 19 and have a distinctive contour or edge shape such as that of a square, circle, triangle, or other unique shape that is identifiable by touch.

The example embodiment of the automated banking machine 10 may include a plurality of input devices such as function keys 14 and a keypad 16. The example embodiment of the automated banking machine 10 may further include other types of input devices, such as a touch screen, microphone, card reader 26, biometric reader or any other device that is operable to provide the automated banking machine with inputs representative of user instructions or information. The example embodiment of the automated banking machine 10 may further include a plurality of transaction function devices, such as a sheet or cash dispenser 20, receipt printer 24 and other devices.

Figure 2:
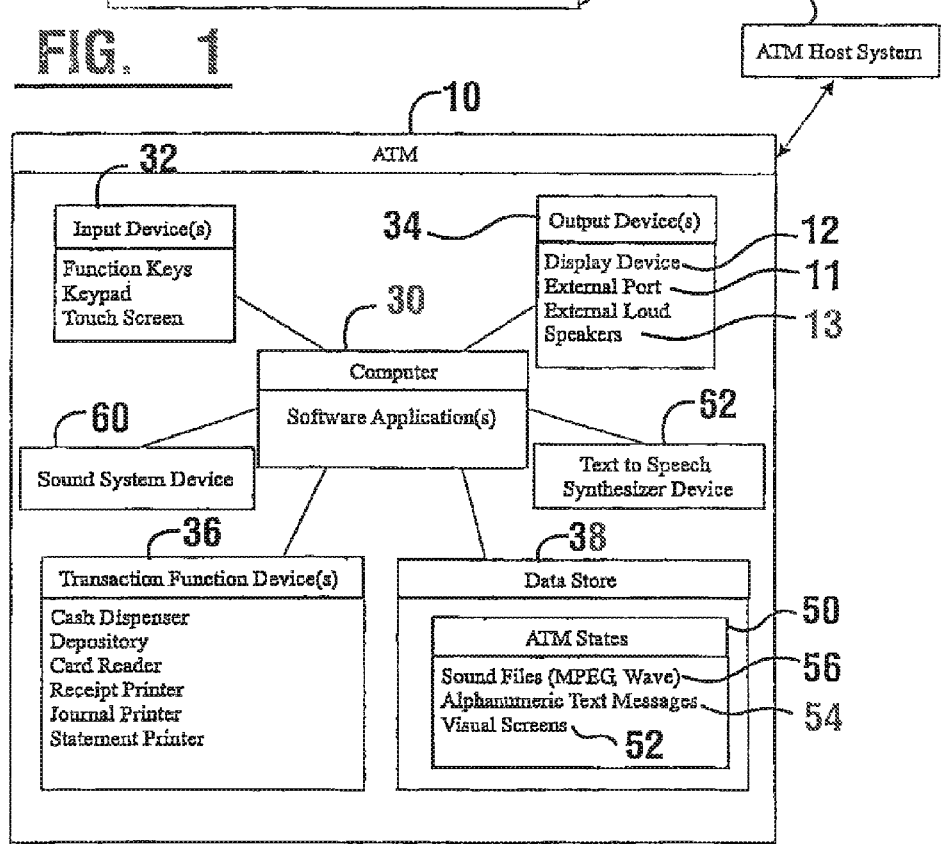
FIG. 2 is a schematic view of the example embodiment of the automated banking machine.

FIG. 2 shows a schematic view of components which may be included in an automated banking machine and a system in accordance with an example embodiment. The automated banking machine 10 may include at least one computer 30. Alternatively the computer may be disposed from the machine such as is shown in U.S. Pat. Nos. 8,205,792; 8,201,732; and 8,181,859 the disclosures of which are incorporated herein by reference in their entirety. The computer 30 may be in operable connection with the input device(s) 32, the output device(s) 34, the transaction function device(s) 36 and at least one data store 38. An example embodiment further includes one or more software application(s) 40 operable in the computer 30. The software applications may include for example terminal control software, maintenance software, diagnostic software and any other software that enables the automated banking machine to perform transaction functions for users and/or enables authorized representatives of an operator of the automated banking machine to service, configure and maintain the automated banking machine. An example embodiment of an automated banking machine may be operable to communicate with a host banking system 42 to enable a consumer to perform such example transaction functions as withdrawing cash from an account through operation of the cash dispenser device 20, depositing checks or other items with the depository device, performing a balance inquiry for a financial account and transferring value between accounts.

An example embodiment may be operable to provide a consumer with a user interface that may be visually displayed and/or output in audible form for the consumer. The example user interface may guide the consumer through the selection of one or more functions which are to be performed by the automated banking machine. Such functions may include a plurality of different transaction functions such as dispensing cash, balance inquiries, deposits and transfers. However, such functions may also include options for navigating through the user interface such as functions for canceling or confirming a selection. Functions may also include options for configuring the user interface, such as changing the human language output through the user interface or changing the volume of the audio output of the automated banking machine. In addition, functions may also include options for making the user interface more user friendly, such as functions that repeat an audible instruction (either the entire instruction or a predetermined number of seconds of an ending portion of the instruction), or that provide help or a description for other functions of the automated banking machine.

An example embodiment of the automated banking machine includes at least one software application such as a terminal control software program that at any given time is operable to be in one of a plurality of different conditions which are alternatively referred to as states. To perform transaction functions, the terminal control software may progress between the various states, prompting the user to input different types of information in some states and performing a transaction function in other states in response to the inputted information. In an example embodiment, the automated banking machine may operate to organize different transaction functions into a hierarchy using a plurality of menus and sub-menus (also referred to herein as "screens"). A menu may be visually and/or audibly output to the consumer for each of the different states the automated banking machine is operable to progress through to select and perform the transaction functions. Each menu may be operable to list those functions which may be performed in any given state of the automated banking machine. Selecting an option or function visually listed or verbally described in a menu may cause the automated banking machine to change to a different state which causes a display and/or output of an audible verbal description of a sub-menu of options or functions available to be performed by the automated banking machine in the new state.

Data store 38 may be operable to store therein, information for generating visible outputs and audible outputs that are representative of menus and sub-menus for a plurality of different states 50 of the automated banking machine. Such information, for example may include stored data for producing visible outputs such as visual screen data 52 for operable states of the automated banking machine. Such information may further include stored data for producing audio outputs such as MP3 or WAV sound files 56 which include verbal instructions for operable states of the automated banking machine. Such stored data for producing audio outputs may also include alphanumeric text messages 54 (also referred to herein as "text-to-speech data"), which may be used by the computer 30 to generate audible verbal instructions for operable states of the automated banking machine. In example embodiments, the visual screen data 52 may be accessed by the computer and used to produce visible outputs through the display device 12. Also, the audio output data such as the sound files 56 and/or text messages 54 may be accessed by the computer and used to produce audible outputs with verbal instructions or descriptions through external loudspeakers 13 and/or headphones. In an example embodiment, the automated banking machine may receive visual screen data and/or audio output data from a host banking system.

As shown in FIG. 2, the automated banking machine 10 may further include a sound system device 60 in operable connection with the computer. The example sound system device 60 may be operable to produce signals that produce audible outputs. Such signals may be directed to the external port 11 and/or the external loudspeakers 13. In one example embodiment, the sound system device may be operable to selectively mix and amplify a plurality of different audio input signals to generate an amplified audible output signal. Alternative example embodiments of the automated banking machine 10 may further include a text to speech synthesizer device 62 which is operable to convert the text messages 54 into the verbal instructions or descriptions included in the audible outputs of the automated banking machine. The example embodiment of the automated banking machine 10 may be designed to be used by consumers with normal vision as well as users who have impaired vision or who are blind. For example, a user with normal vision may view the display screen to read instructions for operating the automated banking machine 10. A user with impaired vision may listen to verbal instructions and descriptions output from the external loudspeakers 13. In addition, a user with impaired vision may operably connect a personal set of headphones 15 or other device with the external port 11 of the automated banking machine to listen to verbal instructions and descriptions in private. As used herein, the phrases "verbal instructions" or "verbal descriptions" are used interchangeably, and may include verbal instructions, commands, descriptions, and/or any other verbal information.

In an example embodiment, the computer associated with the sound system device 60 may be operable to detect the impedance change across the external port 11 when headphones 15 are electrically connected to the external port. Alternatively, in particular embodiments employing a wireless port, a computer may operate to cause the port to sense for receipt of signals from a wireless device in order to detect operable connection of the port with such a device. Of course other approaches for detecting a connection may be used. When the connection is detected, the sound system device 60 and/or computer 30 may be operable to mute any audible output being directed to the external loudspeakers 13. The computer may then be operable to output private verbal instructions through the headphones which describe to the user how the automated banking machine may be operated. In example embodiments, muting an audible output may include the computer or the sound system device operating to lower the volume level of the audible output through the external speakers to a generally silent level. Muting an audible output may also include stopping the playing or production of audio outputs by the computer or the sound system device.

Upon detection of the connection of the headphones or other external device to the external port, the sound system and/or the computer may be operable to change the volume level of the audible output being directed to the headphones or other device through the external port to a predetermined level. Such a predetermined level may correspond to a relatively low volume level that is not likely to cause discomfort to the majority of consumers using the automated banking machine. In the example embodiment, the sound system may be operably coupled with one or more volume changing switches, keys, dials, buttons or other input devices which are accessible to the consumer. After the coupling the headphones or other device to the external port, the volume changing devices may be operated by the consumer to increase or decrease the volume level as desired by the consumer. In an example embodiment, the sound system device and/or associated computer may further be operable to detect when the headphone has been disconnected from the external port. When this occurs the sound system and/or the computer may be operable to mute the audible output to the external port and institute the audible output through the external loudspeakers.

In alternative example embodiments, a key of a keypad of the automated banking machine may be operable to control the volume of audio outputs. When a designated volume key of the keypad or other key is pressed or actuated, the computer may be operable to cause the automated banking machine to change the current volume level and audibly output a word such as "Volume" at the newly selected volume level. For example, when a consumer presses the volume key of the keypad twice in succession, an example embodiment of the banking machine may be operable to output the word "Volume" twice with the second occurrence of the word "Volume" being louder than the first occurrence. When the volume has reached a maximum level, the next time the volume key of the keypad is pressed, the example embodiment of the automated banking machine may be operable to return the volume level to a predetermined minimum usable volume level and output a word such as "Volume" at the corresponding minimum volume level.

Figure 3:
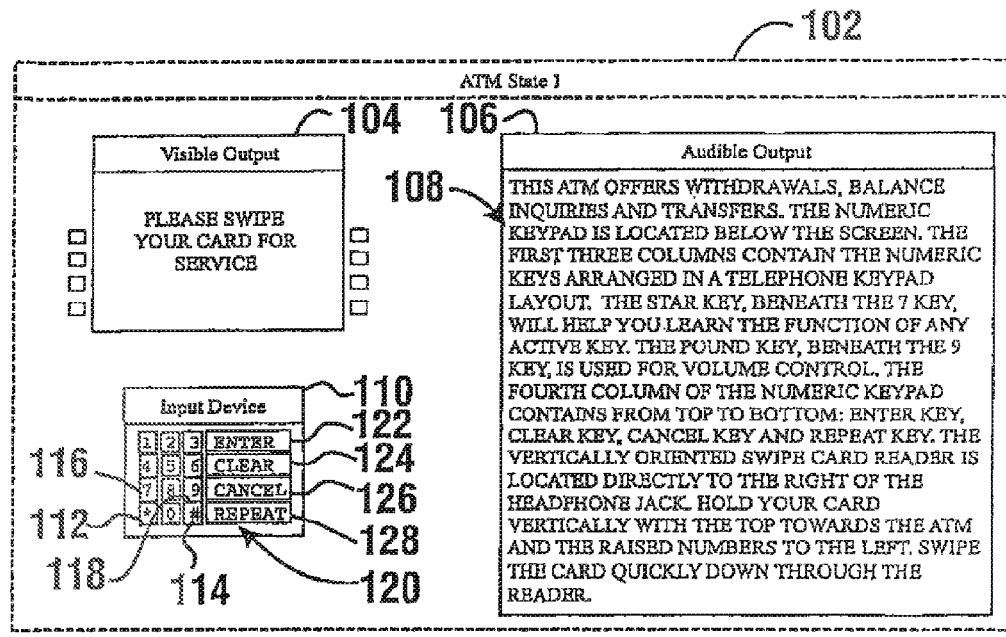
FIGS. 3-13 are schematic views of the example embodiment of the automated banking machine in a plurality of different states of operation.

FIGS. 3-8 show schematic views of the automated banking machine 10 in a plurality of different states. Such states are examples of one example path a consumer may take through the hierarchy of user interface menus for purposes of operating the automated banking machine 10. FIG. 3 shows the automated banking machine 10 in a first mode or state 102 which may be active when a user first approaches the machine. Here the automated banking machine is operable to attract or invite consumers to use the services of the automated banking machine. The example embodiment of the automated banking machine may include a visible output 104 through a display device of the automated banking machine. The visible output may include indicia such as text which informs the consumer that the card may be swiped for initiating operation of the machine.

For users that are visually impaired, the example embodiment of the automated banking machine may further be operable responsive to operation of at least one computer and data stored in at least one data store to output an audible output 106 through external loudspeakers or headphones of the consumer. Such an audible output 106 may include verbal instructions 108 which inform the consumer which types of transaction functions can be performed at the machine. The verbal instructions 108 may also describe the locations of input devices such as a keypad 110 of the automated banking machine and may describe the physical locations and/or configurations of the input devices. In addition, the verbal instructions may describe how the input device may be manipulated to select different functions of the machine and may further describe what the functions perform. Also, the verbal instructions may describe the location of transaction function devices and describe how the transaction function devices may be used.

For example, in the state shown in FIG. 3, the verbal instructions may indicate that the automated banking machine offers transaction functions such as withdrawals, balance inquiries and transfers. In addition the verbal instructions may indicate that the keypad 110 is located below the display device. Further, the verbal instructions may indicate that the keypad is organized similar to a telephone keypad. Also, the verbal instructions may describe the locations of certain keys of the keypad, including their function. For example, the star "*" key 112 may be indicated to be below the seven "7" key 116 and is operable to help the consumer learn the function of any active key. The pound "#" key 114 may be indicated to be below the nine "9" key 118 and is used for volume control. A fourth column 120 of keys in the example keypad may be described as including from top to bottom an enter key 122, a clear key 124, a cancel key 126, and a repeat key 128. In example embodiments, the verbal instructions 108 may further indicate that the swipe card reader is vertically orientated and is located to the right of the headphone jack. In example embodiments, audible outputs may also indicate that the swipe reader is to be used by holding a credit or debit card vertically with the top toward the automated banking machine and with the raised numbers to the left and by swiping the card quickly down through the slot in the reader. Of course these outputs are example and in other embodiments other approaches may be used.

Figure 4:
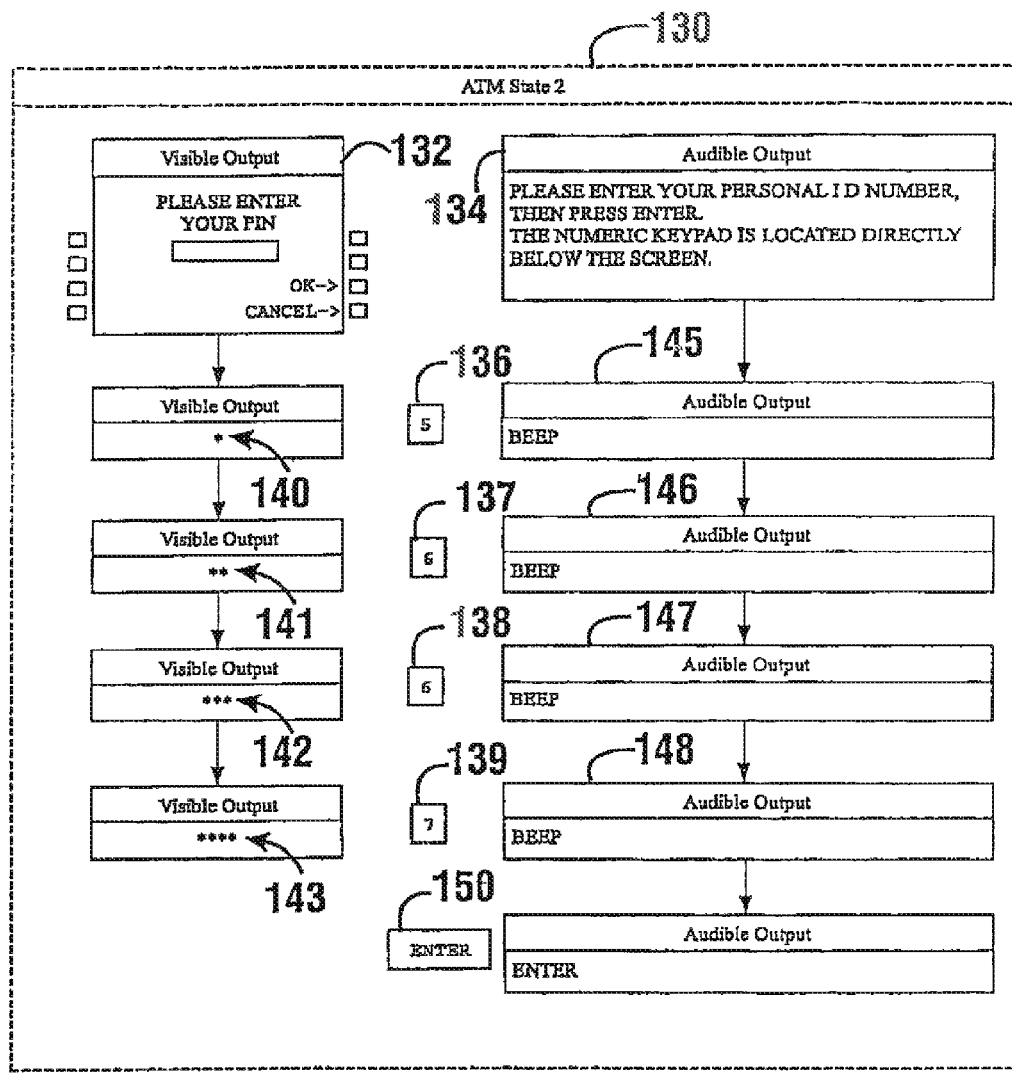

As shown in FIG. 4, the example embodiment of the automated banking machine may be operable to change to a second state 130, after the consumer successfully swipes and/or inserts a card using the card reader of the automated banking machine. In this second state 130, the automated banking machine may be operable to accept the input of a Personal Identification Number (PIN). The visible output 132 and/or the audible output 134 produced when the automated banking machine is in this state, may request that the consumer enter a PIN. As a consumer presses each of the numeric keys 136-139 of the keypad which correspond to the consumer's PIN, the example embodiment of the automated banking machine may be operable to visually and/or audibly acknowledge each input. For example, the visible output 132 may be updated with each key press to display an additional asterisk symbol 140-143. In addition, with each key press the automated banking machine may be operable to produce additional audible outputs 145-148 which may include a beep, or other sound acknowledging each input. When the user presses the enter key 150, the automated banking machine is operable to produce a further audible output which includes a verbal description representative of the enter key such as for example the word "ENTER."

In an alternative example embodiment, upon the detection of the connection of the headphones or other external device to the external port, the computer of the automated banking machine may be operable to cause all or portions of the visible outputs typically provided through the display device of the automated banking machine for a particular state of the automated banking machine to be hidden from view. Hiding the visible outputs is operable to increase the privacy of the visually impaired person using the automated banking machine and prevent a person standing near the automated banking machine from spying on the transaction being performed at the automated banking machine by the visually impaired person. In example embodiments the computer may be operable to keep the entire screen blank while the headphones remain connected to the external port of the automated banking machine. In other example embodiments, portions of the display screen may continue to display non-confidential information while private information associated with a transaction and/or the operation of the machine is only provided verbally through the headphones rather than being displayed on the display screen.

Examples of private information that is not shown through the display screen may include inputted numbers associated with an amount of cash to withdrawal or the value of an item being deposited such as a check. Other examples of private information not shown through the display device may include an account balance or any other transaction information that an automated banking machine is capable of displaying. Further other types of information not shown through the display device may include information which shows the current state of the automated banking machine, such as whether the automated banking machine is being used to withdrawal cash or deposit an item.

Upon detection of the headphones or other external portable device being disconnected from the external port, the computer of the automated banking machine may be operable to redisplay the visible outputs through the display device of the automated banking machine which correspond to the current state of the automated banking machine.

In example embodiments where the display screen is not completely made blank while headphones are connected, the automated banking machine may be operable to display a visual message, advertisement, or other non-confidential information. For example a visual message may be displayed which states that the current visible output may be redisplayed by removing the headphones and/or by providing a specified input. For example, if the person using the automated banking machine has at least some vision ability, the person may prefer to both view visible outputs related to the transaction through the display screen of the automated banking machine and listen to the verbal instructions related to the transaction through headphones. In this embodiment, the computer of the automated banking machine may be responsive to the detection of a specified input through one of the input devices of the automated banking machine to cause the visual outputs for the current state of the automated banking machine to be redisplayed while continuing to output verbal instructions to the headphones.

In a further example embodiment, upon the detection of the connection of an external portable device such as headphones to the external port, the computer of the automated banking machine may be operable to cause all or portions of the visible output through the display device of the automated banking machine to change from a relatively lower contrast to a relatively higher contrast with respect to the contrast between the text (or other indicia) and the background on which the text or other indica is displayed. For example, a typical visual output through a display device may include a relatively lower contrast for the indicia with respect to the background, such as black text on a light grey background. In this described embodiment, such a relatively lower contrast visual output (e.g., with black text on a light grey background) may be changed to a relatively higher contrast visual output such as yellow text on a black background. Other examples of a higher contrast visual output may include white text on a black background, yellow text on a dark blue background, white text on a dark blue background, or any other relatively high contrast arrangement between the hues of text and background compared to a prior visual output that is lower in contrast.

Also, it should be understood that these described colors of the text (or other indicia) and the background may correspond to colors that are substantially the same as described (e.g., substantially yellow, substantially black, substantially white, substantially dark blue, substantially grey).

As used herein and in the claims, the word substantially with respect to a described color corresponds to the indicia or background having the described color or having a variation of the described color that is closer to the described color than all of the other different colors in the set of: red, orange, yellow, green, blue, indigo, violet, white, grey, black, and brown. Also, it should be understood that as used herein, the terms "black" and "white" correspond to colors in which indicia and a background for a visual output is generated, even though black typically represents the absence of light, and white typically represents a combination of many different colors of light.

In addition, as used herein, a change in color of indicia (or the background) in order to increase/decrease contrast of a visual output of a display of an automated banking machine, corresponds to a change in color of the pixels of the display that form the indicia (or the background) from a first color to a second color wherein the second color has a substantially different hue that the first color. As used herein a substantially different hue would not include a mere change in brightness/intensity of an existing color such as a change from light grey pixels to darker grey pixels or for example a change in RGB values of pixels from (211,211,211) to (89,89,89). Rather, as used herein and in the claims a substantially different hue corresponds to a change from one color to another color with a visually perceptible change in hue such as a change in the visible pixels that form the indicia or a background from black pixels to yellow pixels or for example from RGB values of the pixels from (0,0,0) to (255,255,0). In addition to changing colors of a visual output responsive to the detection of a connection of headphones or other specified input, example embodiments may be operable to change the relative contrast between text and background by changing the intensity, brightness, size, font type, boldness, and/or other shape characteristics of indicia displayed on a background, so that the indicia is relatively easier to read. Thus, as defined herein a relatively higher contrast visual output with respect to indica on a background corresponds to a visual output that is relatively easier to read by a visually impaired user compared to the same type of indica displayed with a relatively lower contrast.

To carry out these described example embodiments, the previously described computer 30 and software instructions associated with the automated banking machine 10 may be operable to switch the display 12 from outputting the relatively lower contrast visual output to the relatively higher contrast visual output (or to hide at least some of the indicia on the display) responsive to the detection of the coupling of headphones 15 (or other device) with the external port 11. Also, the computer of the automated banking machine may be operable to switch the display from outputting the relatively higher contrast visual output to the relatively lower contrast visual output (or redisplay hidden indicia) responsive to the detection of the disconnection of the headphones 15 with the external port 11.

Example embodiments may also include an input device (e.g., a button, switch, capacitive touch sensor) adjacent the display device, external port 11, or other location on the housing of the automated banking machine, inputs through which input device is operable to cause the computer to change or toggle the visual output of the display device between the relatively lower and higher contrasts between the text and background (and/or toggle the visual output of the display device between hiding and redisplaying all or portions of the text displayed on the display device). Example embodiments may also enable the computer of the automated banking machine to toggle the visual output of the display device between the relatively lower and higher contrasts (and/or hide/redisplay text) and/or to change the size or form of indicia included in visible outputs responsive to inputs through a touch screen associated with the display, and/or inputs through other input devices on the automated banking machine such as a keypad 16 and function keys 14.

In addition, rather than automatically increasing the relative contrast and/or automatically hiding text or other indicia, and/or changing indicia size or form of indicia, responsive to the detection of a connection of a portable external device (e.g., headphones), the computer of the automated banking machine may be operable to output a prompting message responsive to the detection of a connection of a portable external device. Such a prompting message may indicate and inform the user (e.g., audibly through the headphones and/or via a message on the display device) that the contrast can be increased, changes in text size or form can be provided, and/or the text can be hidden on the display by providing—specified input through an input device of the automated banking machine. The computer of the automated banking machine may then operate responsive at least in part to the specified input to increase the contrast, change the indicia, or hide indicia being outputted on the display screen.

Figure 5:
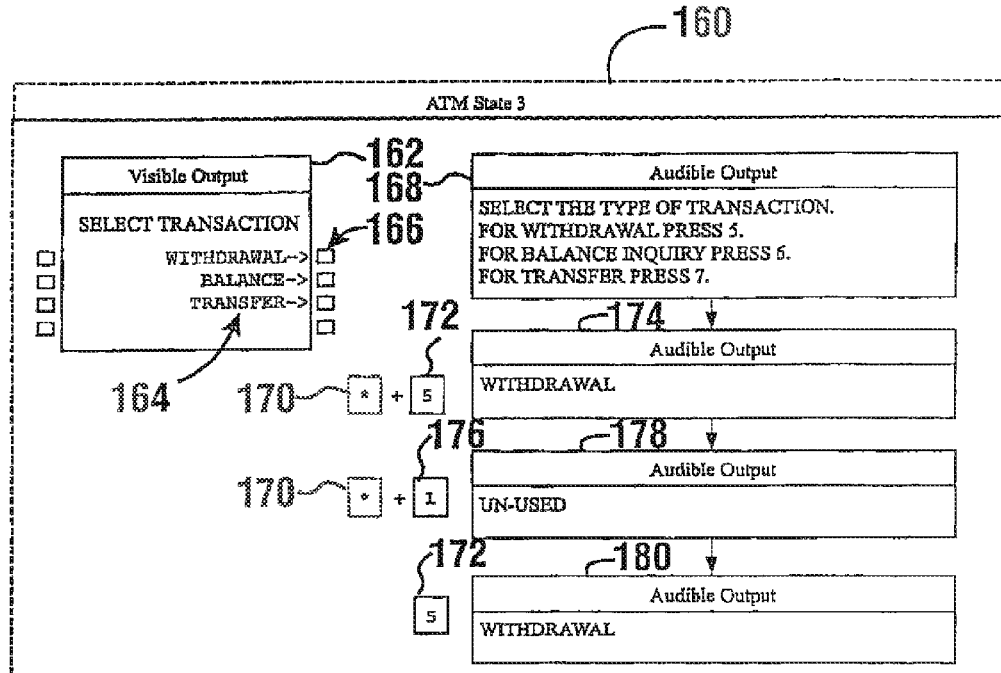

As discussed previously, the contrast may then be lowered and/or the text redisplayed on the display device responsive to the detection of the disconnection of the portable external device and/or responsive to a specified input through an input device of the automated banking machine. Referring to FIG. 4, once the consumer inputs a PIN and presses the enter key 150 of the keypad, the example embodiment of the automated banking machine may be operable to change to a third state in which the automated banking machine is operable to enable the consumer to select one of a plurality of transaction functions to be performed with the automated banking machine. As shown in FIG. 5, when the automated banking machine is in a third state 160 the automated banking machine may produce a visible output 162 which lists the transaction functions 164 and visually points to the function keys 166 that are operable to select each transaction function.

In the example embodiment of the automated banking machine, this described third state may cause the computer in the automated banking machine to produce audible outputs 168 which describe which keys of the keypad are operable to select certain transaction functions. For example, in this described embodiment it may be indicated that the five "5" key may be actuated to select a withdrawal, the six "6" key may be actuated to select a balance inquiry, and the seven key "7" may be actuated to select a transfer.

In the example embodiment, the automated banking machine may be operable to provide a consumer with help to learn which keys perform which functions. For example, if the consumer wishes to verify that the five "5" key corresponds to a withdrawal transaction function without actually selecting a withdrawal transaction function, the consumer may press the star "*" key of the keypad prior to pressing the five "5" key. In this described example embodiment the star "*" key may indicate to the automated banking machine that the next following key is to be verbally described or named. As shown in FIG. 5, when the consumer presses the star "*" key 170 followed by the five "5" key 172, the automated banking machine may be operable to produce a further audible output 174 which verbally indicates the name of the function such as "Withdrawal." When a help key such as the star "*" key 170 is actuated in this embodiment, the automated banking machine may only describe the function associated with the next key press rather than changing to a further state corresponding to such a key press.

Figure 6:
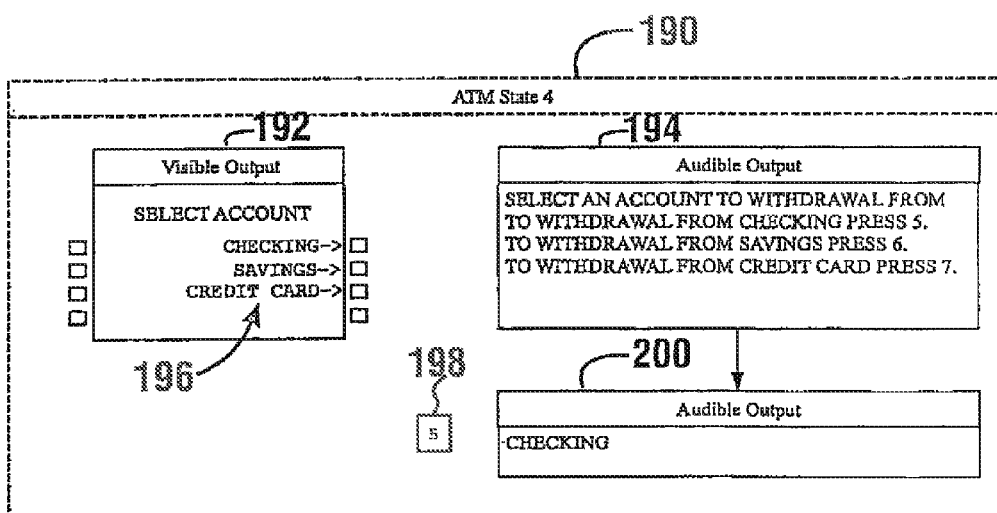

If the consumer presses the star "*" key 170 followed by a key that is not associated with a function in the current state, such as the one "1" key 176, the example embodiment of the automated banking machine may be operable to produce a further audible output 178. The further audible output may verbally indicate that the key is not being used in the current state of the automated banking machine with an expression such as "Un-used." In an example embodiment, the second key for which the user wishes to receive an indication of the function may be pressed within a predetermined time period after the star "*" key 170 is pressed. Such a time period may for example be ten seconds. Of course, these approaches are example and in other embodiments other approaches may be used. In the example embodiment, when a consumer selects a transaction by pressing a key associated with the transaction, such as the five "5" key 172 without pressing the star "*" key 170, the automated banking machine may be operable to change to a fourth state and produce another audible output 180 which verbally indicates to the user the name of the selected function. As shown in FIG. 6, the fourth state 190 may include a visual and/or an audible request that the consumer select or input additional information associated with the performance of the selected transaction function. With a withdrawal transaction, the fourth state may include a visible output 192 which lists the type of accounts 196 that the consumer may select for purposes of making the withdrawal. An audible output 194 may likewise verbally output a list of the types of accounts along with a corresponding key of the keypad to press for selecting each account. As discussed previously, when the consumer selects a key, the example embodiment of the automated banking machine may be operable to produce a further audible output 200, which verbally describes what the consumer has selected. For example, if the consumer presses the five "5" key 198, the audible output 200 may indicate the name of the selection by outputting a word such as "Checking."

Figure 7:
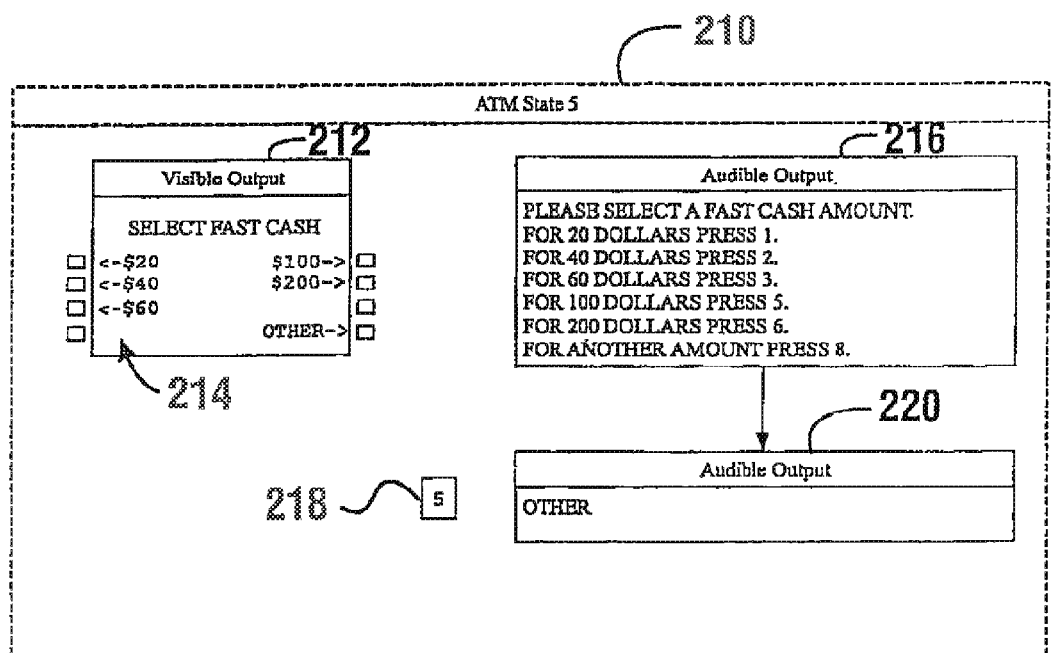

For a withdrawal transaction. a example embodiment may change to a further state after a selection of an account has been made. FIG. 7 shows an example of a fifth state 210, in which the automated banking machine may be operable to accept the selection of an amount of cash to be withdrawn. Here, the automated banking machine may be operable to produce a visible output 212 which lists a plurality of currency amounts 214 which may be selected. Likewise, the automated banking machine may be operable to produce an audible output 216 which verbally indicates which keys of the keypad to press in order to select a particular currency amount.

Figure 8:
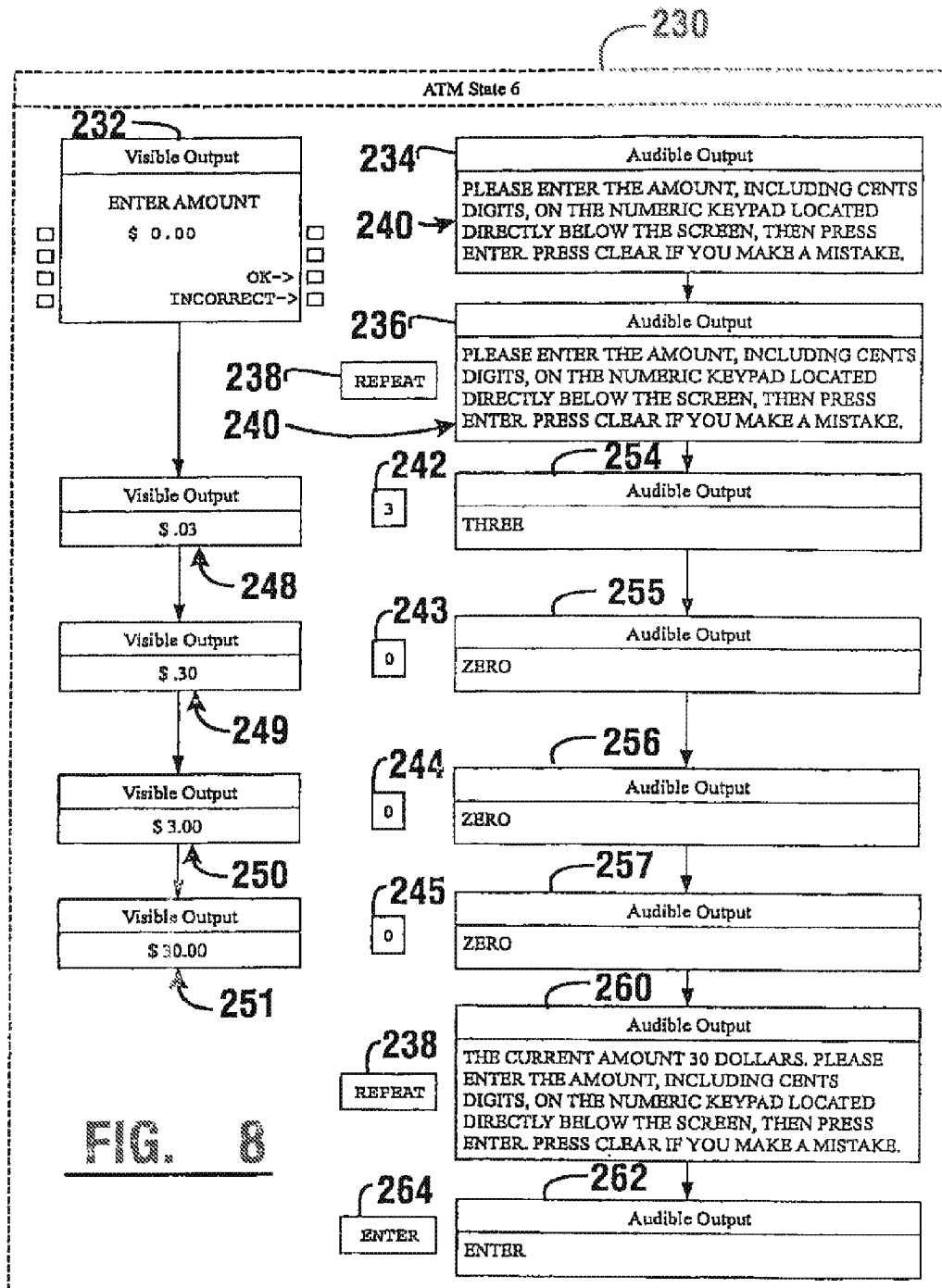

In this example embodiment. the five "5" key 218 corresponds to the selection of another amount for a withdrawal. When this key is pressed, while the automated banking machine is in the fifth state, the automated banking machine is operable to cause the automated banking machine to change to a sixth state and is operable to produce a further audible output 220 which verbally describes this selection with a word such as "Other." As shown in FIG. 8, when the example embodiment of the automated banking machine is in a sixth state 230, the automated banking machine may be operable to enable the consumer to enter a specific amount of cash to withdraw, which amount may be other than one of the predetermined amounts previously presented. Here, the automated banking machine may be operable to produce a visible output 232 which requests that the consumer enter an amount for the withdrawal in a currency such as dollars. In particular embodiments, the automated banking machine may further be operable to produce an audible output 234 which verbally requests that the consumer enter an amount which includes a fractional currency portion such as cents on the keypad.

If for some reason the consumer did not hear or understand all of the verbal instructions 240 of the audible output 234, the computer of an example embodiment of the automated banking machine may be operable to enable the consumer to cause the automated banking machine to repeat the verbal instructions 240 (either all of the last verbal instruction or a predetermined number of seconds of the end of the verbal instruction). In an example embodiment, the computer of the automated banking machine may be operable to produce a further audible output 236 which includes a repeat of the verbal instructions 240 (or portion thereof) responsive to the consumer pressing a repeat key 238 of the keypad.

If the repeat key is pressed before the verbal instructions 240 in the audible output 234 have been completely outputted, the computer of the automated banking machine may be operable to interrupt the audible output 234 and immediately begin outputting the further audible output 236. The further audible output 236 may then repeat the verbal instructions 240 from the beginning (or repeat of a predetermined number of seconds before the point when the repeat key was pressed). In other example embodiments, the computer of the automated banking machine may be operable to produce further audible outputs 236 which include a repeat of the verbal instructions 240 responsive to actuation of any unused key of the keypad which is not associated with another function or a selection available in the current state of the automated banking machine. In further embodiments, additional or alternative input devices may be configured to function as the described repeat key.

In embodiments that are capable of repeating a predetermined number of seconds of the verbal instructions responsive to activation of the repeat key (or other input device), the computer of the automated banking machine may be operable to detect the quick succession of multiple activations of the repeat key (or other input device) within a predetermined amount of time of each other. Such multiple activations of the repeat key (or other input device) may cause the computer of the automated banking machine to repeat the entire verbal instructions, rather than only the described predetermined amount of seconds of the verbal instruction.

When the consumer enters an amount of a withdrawal by pressing the number keys 242-245, the example embodiment of the automated banking machine may be operable to update the visible output 232 to produce visible outputs 248-251 with indicia representative of the current amount entered. Also, the automated banking machine may be operable to produce further audible outputs 254-257 which verbally describe the number associated with the key that was pressed. In the example embodiment, as each key is pressed, the automated banking machine may be operable to determine a new current amount of value. The last two keys pressed may correspond to the fractional portion of the amount such as the cents portion in U.S. currency. The current amount may be stored in a memory or buffer in operable connection with the computer of the automated banking machine. Pressing the repeat key 238 while a withdrawal amount has been or is being entered, may cause the automated banking machine to produce a further audible output 260 which verbally indicates the current amount stored in the memory of the automated banking machine. In an example embodiment, the audible output 260 may also include a repeat of the verbal instructions 240.

Figure 9:
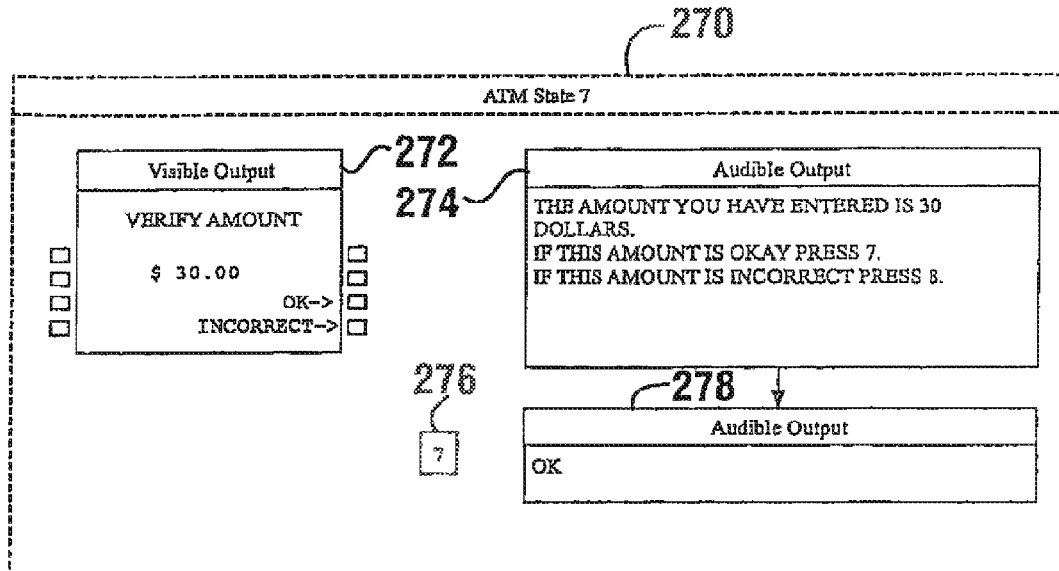

When the consumer has completed entering an amount, the consumer may press the enter key 264. Pressing the enter key may cause the automated banking machine to change to a seventh state and produce another audible output 262 which verbally describes that the enter key has been pressed. FIG. 9 represents the automated banking machine in a seventh state 270. Here, the example embodiment of the automated banking machine may be operable to produce a visible output 272 which requests that the consumer verify that the amount entered in the preceding state is correct. The automated banking machine may also be operable to produce an audible output 274 which verbally indicates the current amount entered and requests that the consumer press keys of the keypad to verify that the amount is either correct or incorrect. In this described example embodiment, the consumer may verify the amount by pressing the seven "7" key 276 of the keypad. When the seven "6" key is pressed, the automated banking machine may be operable to produce an audible output 278 that verbally indicates a description of the selection by outputting a word such as "OK."

Figure 10:
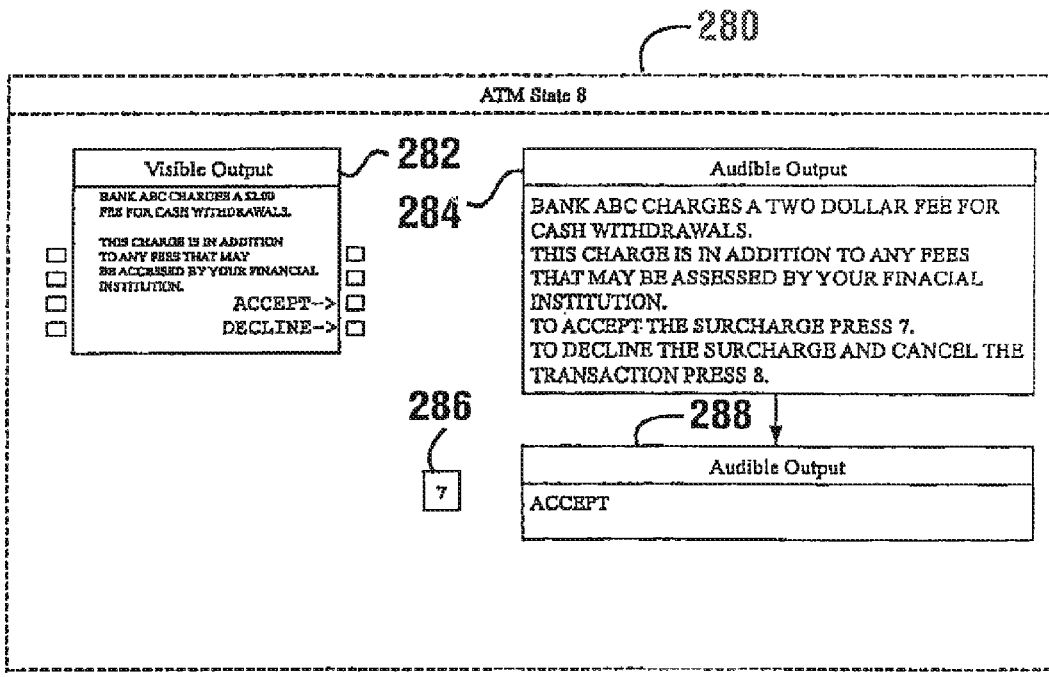

Once an amount has been verified by the consumer, if the automated banking machine is configured to charge a surcharge for the transaction, the automated banking machine may change to a further state such as the eighth state 280 shown in FIG. 10. In an example embodiment, the automated banking machine may be operable to produce a visible output 282 which discloses the fee for the withdrawal and requests that the user accept or decline the surcharge. The automated banking machine may further be operable to produce an audible output 284 which verbally describes the fee and indicates which keys of the keypad may be pressed in order to accept or decline the surcharge.

Figure 11:
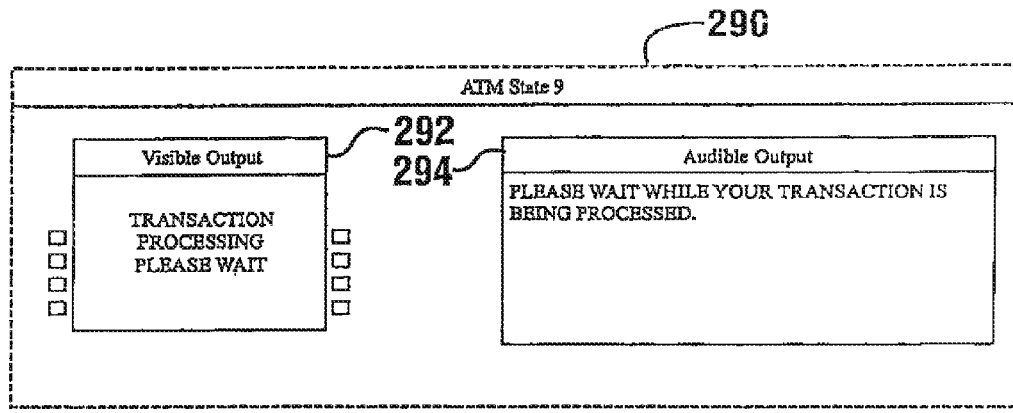
Figure 12:
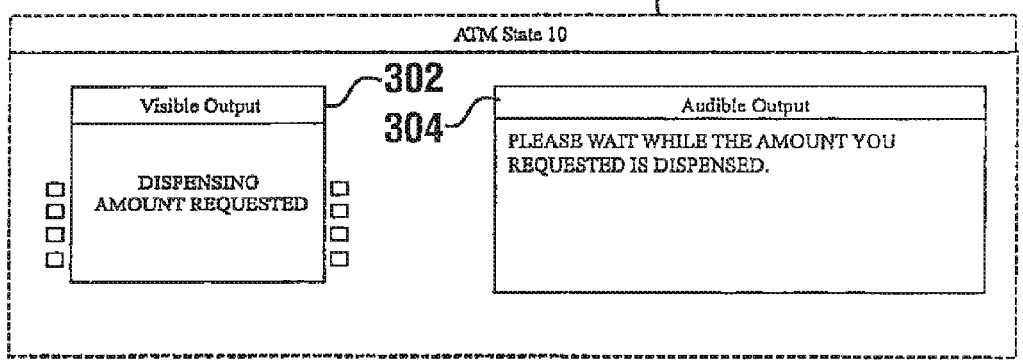

If the consumer accepts the charge by pressing the seven "7" key 286 for example, the automated banking machine may be operable to produce the further audible output 288 which verbally indicates that the user has accepted the surcharge by outputting a word such as "Accept." Once a consumer has accepted the surcharge (if applicable for the transaction), the example embodiment of the automated banking machine may be operable to change to a ninth state 290 represented in FIG. 11 in which the automated banking machine produces a visible output 292 and/or an audible output 294 which indicates that the transaction is being processed. Once the withdrawal has been authorized, the automated banking machine may be operable to change to a tenth state 300 represented in FIG. 12. In this state the example embodiment of the automated banking machine may produce a visible output 302 and/or an audible output 304 which indicate that the automated banking machine is in the process of dispensing the requested amount.

Figure 13:
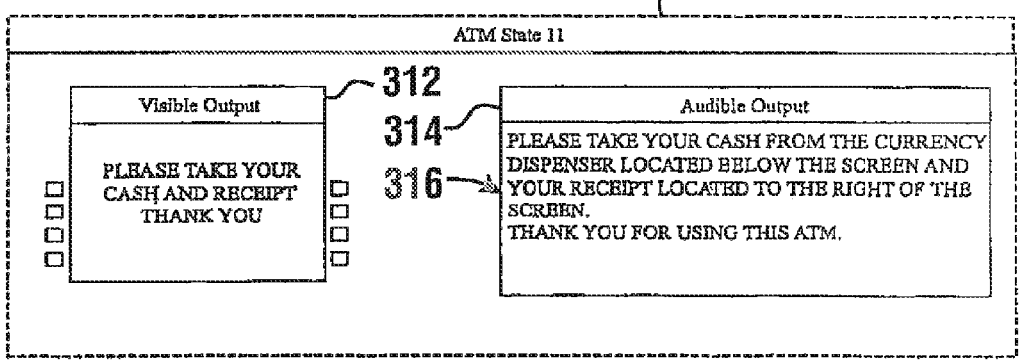

Once the example embodiment of the automated banking machine has dispensed an amount of cash with the cash dispenser that corresponds to the requested amount, the automated banking machine may be operable to change to an eleventh state 310 as represented in FIG. 13. In the eleventh state the automated banking machine may be operable to produce a visible output 312 and/or an audible output 314 which indicate that the consumer may take the dispensed amount of cash and a receipt from the automated banking machine. In addition, the verbal instructions 316 of the audible output may further describe the locations of the opening through which cash is delivered and the opening through which a receipt is delivered on the automated banking machine.

Once the transaction function has been completed, in an example embodiment the automated banking machine may return to a previous state such as the described third state 160 shown in FIG. 5 for selecting another transaction or the described first state 102 shown in FIG. 3 for attracting new consumers. It is to be understood that the described automated banking machine states, visible outputs, and audible outputs are examples of performing one type of transaction. Other transaction functions for the described automated banking machine and alternative embodiments of the automated banking machine may have additional and/or other types of automated banking machine states, visible outputs, and audible outputs.

In some example embodiments, pre-existing automated banking machines which do not offer a user interface for the visually impaired may be upgraded to include some or all of the previously described features. Such an upgrade may include installing new terminal control software that is operable to cause the computer to direct the previously described audible outputs through a sound system device of the automated banking machine. Such upgraded terminal control software may further be operable to cause the automated banking machine to repeat verbal instructions, provide verbal help for selections, and/or change the volume of the audible output as described previously.

Figure 14:
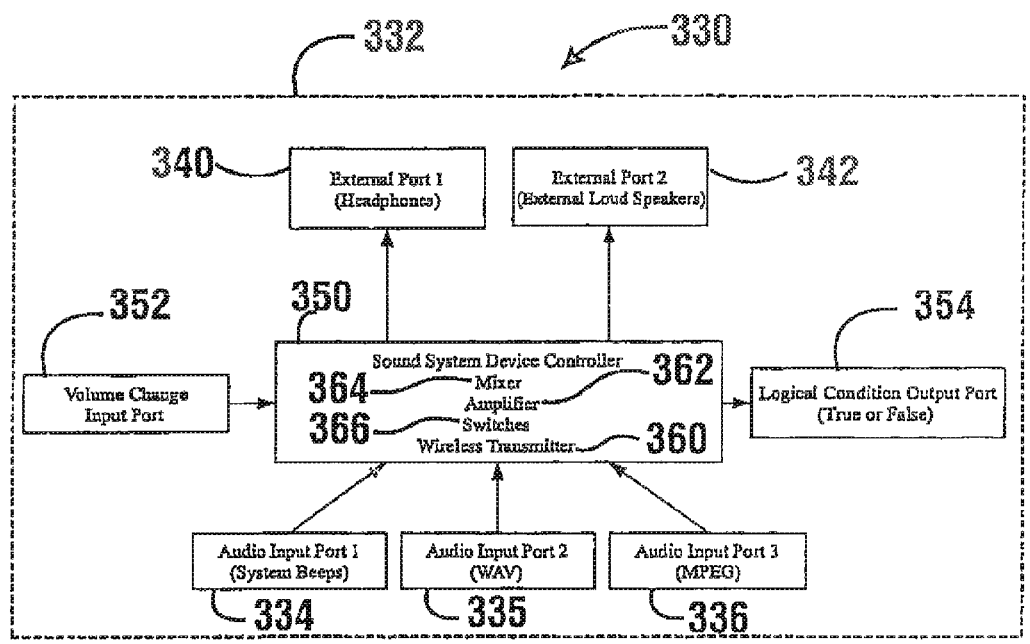
FIG. 14 is a schematic view representative of an example audio system.

In addition, such an upgrade of a pre-existing automated banking machine may include the installation of an audio system that is operable to further enable an automated banking machine to have some or all of the previously described features. FIG. 14 shows an example of an audio system 330 which is adapted to provide an automated banking machine with support for headphones 340 using an example embodiment of a sound system device 332. The sound system device 332 may be adapted to accept one or more audio signals through audio input ports 334-336. Such input ports may be connected to the output ports of one or more audio output devices of the automated banking machine. For example, such audio output devices of an automated banking machine may include a sound card that is operable responsive to operation of the computer associated with the automated banking machine to produce sound signals from WAV or MP3 files. In addition, the automated banking machine may include audio output devices for generating audio signals with beeps and other prompting sounds to assist a consumer in operating the automated banking machine. Also, the example embodiment of the automated banking machine may include a text-to-speech synthesizer audio output device and/or software which is operable to produce audio signals with verbal instructions responsive to alphanumeric text-based instructions included in visual display outputs. For example, the computer of the automated banking machine may execute text-to-speech software that is operable to produce audio signals with verbal instructions responsive to the text displayed on the display device of the automated banking machine (e.g., text included in screen data received from a host system). Further embodiments, of the text-to-speech software may be configured to produce audio signals with verbal instructions responsive to text data in files associated with or referenced by the screen data used to generate visual screens on the display device of the automated banking machine.

In addition, further examples may use text-to-speech software to produce audio signals responsive to other text associated with the automated banking machine. For example, automated banking machines may be operable to print receipts, statements, tickets, and/or other items which include information (e.g., account balance amount, cash dispensed amount, account data, and/or other transaction information) that may or may not be displayed on the display device. The computer of an automated banking machine may be operable to produce audio signals with verbal information describing at least some of the text and numbers printed (or being printed) via a printer to produce a transaction receipt (or other item) responsive to the text and numbers printed (or being printed).

The example sound system device 332 may include a controller 350 which comprises at least one computer that is operable to manipulate one or more audio signals individually through the audio input ports 334-336. The controller 350 may include an amplifier 362 and mixing circuits 364 which are operable to selectively amplify and mix the audio input signals together to produce one or more amplified audio signals. Such amplified audio signals may be selectively directed by the controller 350 through one or more of the external ports 340, 342 of the sound system device. In an example embodiment, the external ports 340, 342 correspond to speaker ports that are adapted to releasably connect to headphones and external loudspeakers. In the example embodiment, the sound system device 332 may include one or more selectable adjustable switches 366 such as jumpers, dip switches, or other electronic switches which can be configured to set relative amplification and other characteristics for mixing one or more audio signals received from the audio input ports 334-336.

In an example embodiment, the sound system device 332 and the controller 350 may be in operable connection with a volume change input port 352. The volume change input port 352 may be operable to receive electrical signals responsive to the operation of one or more volume controls such as a momentary switch, key, button or other consumer accessible switch. The controller 350 may be configured to cycle through one of a plurality of volume levels responsive to the electrical signals received from the operation of the volume control. The controller 350 may be operable to amplify the amplified audio signals responsive to the currently selected volume level. When the volume level reaches a maximum level, the example controller may be operable to change the volume level to a predetermined minimum level responsive to the next electrical signal received from operation of the volume control.

In an example embodiment, the automated banking machine may include a volume control such as a button adjacent the keypad which is in operable connection with the volume change input port 352 of the sound system device 332. However, in other example embodiments, the controller may be operable to receive volume changing signals from the computer of the automated banking machine. Terminal control software may be configured to detect events such as the clicking of a pound "#" key of the keypad and cause the computer to output a volume changing signal to the sound system device.

As discussed previously, the sound system device 332 may be operable to mute amplified audio signals being directed through the external port 342 for external loudspeakers, responsive to the sound system device detecting the connection of headphones or other devices with the external port 340. In an example embodiment the controller 350 may be operably configured to detect the impedance change across the external port 340 when headphones are electrically connected to the external port. For wireless or other types of ports computerized detection of certain signals or other properties may be used to detect a connection. In the example embodiment, when the connection is detected the controller 350 may be operable e to switch off any amplified audio signals being directed to the external port 342 for the external loudspeakers.

In addition, upon detection of the connection of the headphones or other devices the controller 350 may be operable to change the volume level of the amplified audio signals being directed to the external port 340 for the headphones to a predetermined level selected from one of the plurality of volume levels produced by the sound system device. Such a predetermined level may be configured with a jumper, dip switch, or other selectable switch associated with the sound system device. The predetermined level for example may be set to a volume level that is loud enough to be capable of being heard by almost all consumers, but is sufficiently low to be unlikely to cause discomfort to the majority of consumers using headphones with an automated banking machine.

In the example embodiment, the controller 350 may further be operable to detect when the headphone has been disconnected from the external port 340 for the headphones. When this occurs the controller may be operable to mute the amplified audio signals to the external port 340 for the headphone and institute the delivery of amplified audio signals to the external port 342 for external loudspeakers.

Also, in the example embodiment, the controller 350 may be in operable connection with a logical condition output port 354 that is adapted to communicate with the computer. The controller 350 may be operable, responsive to the detection of the headphones connected to the external port 340 for the headphones, to set the logical condition output port 354 to an electrical condition representative of true or on. When the controller 350 detects that the headphones are no longer connected to the external port 340 for headphones, the controller may be operable to set the logical condition output port 354 to an electrical condition representative of false or off. In the example embodiment, the computer of the automated banking machine may be configured to poll or monitor the condition of the logical condition output port 354. The terminal control software may be configured to turn on or off audible outputs being directed to the audio input ports 334-336 of the sound system responsive to the current condition of the logical condition output port 354. Thus for example, when the headphones are not attached, an example embodiment of the automated banking machine may be configured to output system beeps and other prompting sounds through the external loudspeakers. However, when headphones are connected and the condition of the logical condition output port 354 changes to true or on, the example terminal control software may be programmed to begin producing signals corresponding to audio output with verbal instructions for operating the machine which is directed to the headphones.

In further alternative example embodiments, the sound system device may further include a wireless transmitter 360. Such a transmitter may be operably configured to transmit a wireless audio signal through an external port of the sound system device. Such a wireless audio signal may be received by a wireless receiver of the consumer such as wireless headphones, a smart phone or other suitable external device usable by the consumer for receiving outputs from the automated banking machine.

In alternative embodiments, the wireless audio signal may be encrypted by the automated banking machine to minimize possible eavesdropping on the transaction by a third party. Such encryption may include a handshaking protocol between the automated banking machine and the headphones or other wireless receiver device of the consumer which verifies that the consumer currently accessing the automated banking machine is the only party that can decipher the audio signals in the wireless transmission from the automated banking machine. For example, in one example embodiment, wireless audio signals between the headphones and the automated banking machine may be transmitted using wireless network technology such as BlueTooth or IEEE 802.11.

In such embodiments, the automated banking machine may output to each consumer within range of the automated banking machine a verbal message which includes a unique session code. When the consumer has access to the machine, the consumer can enter their unique access code before entering a PIN. Based on the unique access code entered, the automated banking machine may then direct the audio signals related to operating the automated banking machine only to the set of wireless headphones which originally received the access code from the automated banking machine.

In further example embodiments, the automated banking machine may be configured to direct private wireless audio signals to the headphones or other receiver device of the consumer based on information retrieved from the card or other input used to access the automated banking machine by the consumer. For example, such information from or correlated with data on the card or other input may enable the automated banking machine to retrieve or determine a private network address, encryption key, digital certificate, or other information associated with the headphones of the consumer, which may be used by the automated banking machine to establish secure and private communications with head phones or other wireless devices of the consumer. In further alternative example embodiments, the handshaking protocol between the automated banking machine and the wireless headphones or receiving device used by the consumer may be based on a biometric input received from the consumer currently accessing the automated banking machine. Such biometric input for example may include a fingerprint scan, facial recognition system or other biometric scan of the consumer. The automated banking machine may then selectively send private wireless audio signals only to that set of headphones which is operably configured with information that corresponds to the biometric input corresponding to the particular user.

The example embodiments of an audible user interface system and method have been described for use with an automated banking machine such as an automated teller machine. However, it is to be understood that one or more of the features described related to providing an audible user interface may also be used in other self-service terminals such as voting machines and kiosks.

As discussed previously, example embodiments of automated banking machines may output verbal instructions in response to alphanumeric text messages 54. Such automated banking machines may include a text-to-speech device 62 which includes at least one computer and/or text-to-speech software which is operable to convert the alphanumeric text messages 54 to verbal audible outputs. As discussed previously, such alphanumeric text messages 54 are also referred to herein as text-to-speech data.

The text-to-speech data may be stored in a local data store of the machine. For example, in one example embodiment, text-to-speech data may be included in one or more files stored on a hard drive of the machine. One or more of the text-to-speech files may be associated with visual screen data 52 also stored on the machine for use with generating visible outputs through the display device of the machine. In example embodiments, screen data 52 may specify which text-to-speech files to access for use with generating audible outputs during the display of the visible outputs.

In example embodiments, the text-to-speech data may be transferred to the machine from a remote server such as a host banking system. Although, in some example embodiments, the host banking system software may be updated to accommodate the transfer of text-to-speech data to automated banking machines, alternative example embodiments may include a method of using existing or legacy host banking systems to transfer text-to-speech data to an automated banking machine. Such a method may include providing monitoring software on the automated banking machine which is capable of detecting and retrieving text-to-speech data from legacy messages originally designed for other types of automated banking machine configuration data. For example, legacy automated banking machine protocols such as Diebold 9Ix may include messages which are operable to transfer screen data to automated banking machines from a host banking system. Such legacy protocols for transferring screen data may include attributes which are associated with or are used to label the screen data being transferred using the protocol. Examples of such attributes associated with screen data messages may include a screen name/number and a bank number.

An example embodiment of the described monitoring software may be operable to cause at least one computer to monitor one or more of such attributes in the screen data messages. Screen data messages which include text-to-speech data may include predefined values for one or more of these attributes which the monitoring software is operable to recognize as indicating that the screen data message includes text-to-speech data. When such predefined attributes are detected the monitoring software is operable to read the text-to-speech data from the screen data messages and store the text-to-speech data on the machine.

In an example embodiment the attributes used to indicate the presence of text-to-speech data in the screen data messages may also be used to specify, label, or describe features of the text-to-speech data. For example the attributes may be used to identify the human language associated with the text-to-speech data (e.g., English or Spanish). Such attributes may also provide information usable by the monitoring software to label or name the text-to-speech data. For example, the following data may be included in a screen data message sent to an automated banking machine from a host banking system:

015 900 [E]_OOO Please select your transaction. For a withdrawal press 1. To make a deposit, press 2. To transfer money, press 3.

An example embodiment of the monitoring software may be operable to monitor the attribute associated with the bank number for values which indicate that the screen data message includes text-to-speech data. In this described example embodiment, bank numbers greater than or equal to 900 are used to specify that text-to-speech data is present in the message. When bank numbers greater than or equal to 900 are detected by the monitoring software, the monitoring software may be operable to use the information provided in the screen data message to generate a text-to-speech file.

In an example embodiment, the text-to-speech file generated may be placed in a predetermined and/or configurable directory on the machine. In other example embodiments, the text-to-speech file may be placed in a directory specified by the screen data in the message. For example, in an example embodiment the bank number may be used to specify a name of a directory on the hard drive of the machine to store the text-to-speech file. Each directory may correspond to a different human language, so that all text-to-speech files stored in a particular directory correspond to the same human language. In the above example, the screen data message includes the bank number of 900. In example embodiments, a bank number with a value of 900 may correspond to a human language such as English. Also, in such example embodiments, a bank number with a value of 901 may correspond to another human language such as Spanish.

When the screen data is associated with the bank number with the value of 900, the monitoring software may be operable to generate and store a corresponding text-to-speech file in a directory reserved for English language text-to-speech files. Whereas, when the screen data is associated with the bank number with the value of 901, the monitoring software may be operable to generate and store a corresponding text-to-speech file in a directory reserved for Spanish language text-to-speech files.

In one example embodiment, text-to-speech directories may include names which correspond to all or portions of the bank number or other attribute which are used to specify the human language of the text-to-speech data. For example, text-to-speech files may be placed in a directory with a name that corresponds to one or more of the digits of its associated bank number. Thus text-to-speech files associated with the bank number of 900 may be placed in a directory with a name such as "lang000," while text-to-speech files associated with the bank number of 901 may be placed in a directory with a name such as "lang001." Likewise, text-to speech files associated with the bank number of 902 may be placed in a directory with a name such as "lang002." In this described example embodiment, one or more of the digits or other characters which distinguish between the different bank numbers or other attributes may be used in the name of corresponding directories used to store the text-to-speech files. In example embodiments, other data or attributes associated with the screen data message may be used by the monitoring software to generate a name for the generated text-to-speech file. For example, in the above example, the screen data message includes a screen name attribute with a value of "015." This screen name may be included in the name of the generated text-to-speech file. Also, in the above example, the screen data following the bank number includes a letter "E" in brackets. The monitoring software may also be operable to identify the letter between the brackets following the bank number and use the identified letter in the name of the file.

As a result, the corresponding file name generated by the monitoring software from the above example of a screen data message may include the characters "EO15." In example embodiments, the monitoring software may include other characters in the file names such as a descriptive prefix and extensions. In one example embodiment, generated text-to-speech files include a prefix such as "TT" and an extension such as "htm." For the above example of screen data, the corresponding text-to-speech file name would be "TTE015.htm."

In example embodiments, the monitoring software may be operable to generate text-to speech files which include HTML tags, Java script, VB script, XML, and/or other code which is operable to cause the automated banking machine to generate audible outputs responsive to the text-to-speech data stored in the file. For example, in the above example, the screen data following the brackets may correspond to text-to-speech data. The monitoring software may be operable to place this text-to speech data in an HTM file along with HTM tags, Java script and/or other interpreted code which is operable to cause the automated banking machine to process the text-to-speech data with text-to-speech devices 62 and/or software on the machine. In one example embodiment, the HTM text-to-speech file may reference an ActiveX control or other external software. The automated banking machine may include a browser or other HTML responsive software which is operable to read the HTM text-to-speech file and in response to the file access and/or send the screen data as an argument to an ActiveX control. The ActiveX control may be programmed to accesses and/or cause the text-to-speech device or software of the automated banking machine to convert the text-to-speech data to corresponding audible outputs.

In the above example, the text-to-speech device and/or software would output verbal instructions representative of the spoken command "Please select your transaction. For a withdrawal press 1. To make a deposit, press 2, To transfer money, press 3." In an example embodiment, the text-to-speech data may include additional attributes which are not intended to be spoken but are intended to configure the operation of the text-to-speech device and/or software. In the above example, the screen data begins with the four characters "_000." The text-to-speech device and/or software may be responsive to these characters to determine which human language to use when generating verbal instructions from the text-to-speech data. For example, the beginning characters "_000" may correspond to the human language English. As a result, the text-to-speech device and/or software may convert the subsequent text-to-speech data to audible outputs which correspond to an English pronunciation of the text-to-speech data.

In an example embodiment, the terminal control software operable in at least one computer of the machine may be operable to access the text-to-speech files responsive to screen data files. Thus, when the automated banking machine produces a visible output responsive to a particular screen data file, the screen file may reference an associated text-to-speech file which describes the features of the visible output.

With the above described example embodiment, both visual screen data and associated text-to-speech data can be updated on an automated banking machine using standard or legacy automated banking machine protocols and messages from a host banking system. In addition, for each state of an automated banking machine, screen data and associated text-to-speech data may be downloaded to the PC in multiple languages. Depending on the language preference of the user operating the machine, terminal control software in the automated banking machine is operable to access the screen data and text-to-speech data which corresponds to the language preferred by the user.

In further example embodiments, the monitoring software may be operable to monitor screen messages for the presence of screen data and responsive thereto, saving the screen data in an ASCII text format or other format in a single display screen file on the hard drive of the automated banking machine. Further, the monitoring software may be operable to monitor for the presence of state messages from a host banking system. The monitoring software may be operable responsive to the detection of a state message to retrieve state information from the messages and store the state information in a single state file. In further example embodiments, the monitoring software may be operable to store screen data that comes from a host banking machine in a Diebold OAR (Open Account Relation) message or as part of a screen update data field in a function command message.

In example embodiments, HTML code accessible to the automated banking machine for generating user interfaces for operating the automated banking machine may include the use of the "^" symbol or other symbol or tag which causes an HTML responsive program (such as a browser) to access one of the described text-to-speech, display screen, or state files generated by the monitoring software.

For example HTML code for generating a user interface may include the command "0154. The "^" symbol may be detected by the browser accessing the HTML code and in response thereto the browser may access a text-to-speech file such as "TTS154.TXT" from the appropriate language director such as lang000. The text-to-speech file "TTS154.TXT" may have been created by the monitoring software responsive to a screen message as discussed previously. In another example, the "^" or other symbol or tag may reference a display screen file generated using the monitoring software such as the display screen file "SCR035.txt." The data from the display screen file may be incorporated into a visual display screen generated by the automated banking machine. By referencing such text-to-speech, visual display screen, or state files from HTML code, the automated banking machine can be dynamical updated to display visual or output audible information representative of different surcharge amounts, or low bill denominations without having to alter the programming of the host system software. A further example embodiment may include a sound configuration software component which is operable to aid a technician with the process of configuring an automated banking machine to provide audible outputs with verbal instruction. In one example embodiment, the sound configuration software may be located on a portable medium such as a CD/DVD disk or other storage medium. The portable medium may be placed in a corresponding reading device of the automated banking machine (e.g., CD/DVD reader) and the sound configuration software may be executed from the portable medium.

In an example embodiment, the sound configuration software may be operable to cause at least one computer to configure and/or update an automated banking machine to include sound software and/or data necessary to enable the automated banking machine to generate audible outputs with verbal instructions. Such sound software may include text-to-speech synthesizer software, the previously described monitoring software, and/or any other sound system related software or data.

The sound configuration software may also be operable to copy from the portable medium verbal instruction data (e.g., text-to-speech files, WAV files, and/or MP3 files) which corresponds to display screens provided by the automated banking machine which are not typically retrieved from a host. For example, automated banking machines may include an offline screen if the automated banking machine is powered on without having a communication connection with a host banking system. Automated banking machines may also include an out of service screen if they have communication with the host established but have not received screen messages from the host. Automated banking machines may also include screens to handle situations where a transaction will require a particular device which is currently being serviced or where the device requires interaction with the user. For these described screens, the sound configuration software may be operable to copy from the portable medium verbal instruction data to the automated banking machine which is operable to cause the automated banking machine to generate audible outputs which verbally describe these screens.

In addition, manufacturers of automated banking machines often produce many different models of automated banking machines with different physical shapes and sizes. Different models may have the display screen, keypad, cash dispenser, and other devices positioned in different locations with respect to each other. Further, even for the same model of automated banking machines, the positions of some devices may be located in a plurality of different positions depending on the preferences of the owner and/or operator of the automated banking machine. Because the audible outputs from the automated banking machine may include verbal instructions which describe the location of the devices on the automated banking machine, different automated banking machines may require verbal instruction data which is customized to the physical configuration of the automated banking machine.

In an example embodiment, the sound configuration software may cause the computer of an automated banking machine to output a tutorial which prompts the technician to input information representative of what devices are installed on the automated banking machine and/or where on the automated banking machine the devices are located. For example, not all automated banking machines include a depository mechanism or coin dispenser. Thus, an example embodiment of the sound configuration software may query the technician to determine whether a depository mechanism or coin dispenser is present. If a depository mechanism is determined by the configuration software to be present, the sound configuration software may further query the technician to determine the location of the depository mechanism relative a fixed point such as the screen or other landmark on the automated banking machine.

In example embodiments, the sound configuration software may further query the technician as to the type of devices installed on the automated banking machine. For example, automated banking machines may include different types of card readers such as an insert reader, swipe reader, vertical DIP reader, or horizontal DIP reader. An example embodiment of the sound configuration software may be operable to prompt the technician to select which type of card reader is installed.

Based on the answers provided by the technician, the sound configuration software may cause at least one computer to copy data files from the portable medium to the hard drive of the automated banking machine which are operable to correctly configure the automated banking machine to provide audible outputs customized to the physical configuration of the automated banking machine. As a result, after the sound configuration software has configured the automated banking machine, the automated banking machine may be operable response to at least one computer to provide audible outputs with verbal instructions which accurately describe the locations of devices (e.g., "to the right of the monitor") and their method of use (e.g., "insert card" or "swipe card vertically").

In an example embodiment, the answers provided by the technician associated with the location and/or type of devices installed on the automated banking machine may be stored in a data store on the automated banking machine. A tutorial included with the sound configuration software may present configuration options for the sound software being configured responsive to the data in this data store. In example embodiments, this data store may remain on the hard drive of the automated banking machine. Thus the next time the sound configuration software is executed from the portable medium, the tutorial may proceed using the data provided by the technician previously rather than forcing the technician to re-answer each question regarding the location and/or type of devices on the automated banking machine. However, example embodiments of the sound configuration software may also enable the technician to update the data stored in the data store as needed.

In further example embodiments, the portable medium may be customized for different customers of the manufacturer of the automated banking machines. For example, a customer may have a relatively small set of combinations of automated banking machine models and associated devices. For this customer, a custom portable medium may be created which includes sound configuration software which prompts the user with questions specific to the range of automated banking machine models and associated devices the customer is expected to have. Thus, if the customer only has insert type card readers, the sound configuration software on the customer specific portable medium may be operable to not prompt the technician as to the type of card reader installed on the automated banking machine. Further, the customer specific portable medium may include audible output data which generates audible outputs specific to the customer. For example, a text-to-speech file associated with a welcome screen of the automated banking machine may include the name of the customer (e.g., "Welcome to Bank XYZ").

Automated banking machines which include features that enable a user to receive verbal instructions through a portable audio output device such as headphones are often used in external environments where they are exposed to rain, snow and other contaminants. Damage to the electrical contacts or other internal components of the automated banking machine may occur when water or other contaminants enter an interior area of the machine through the opening that is provided by an external port similar to external port 11 that enables a user to insert therein the electrical connector plug that is attached to their headphones. Because this external port has an opening that is always open except in circumstances where an electrical connector plug is inserted therein, contaminants may enter and accumulate causing damage through corrosion, electrical shorting or other conditions within the machine. Further the introduction of moisture may corrode and/or damage the electrical contacts associated with the headphone jack or circuit cards or other devices to which they are attached.

Figure 15:
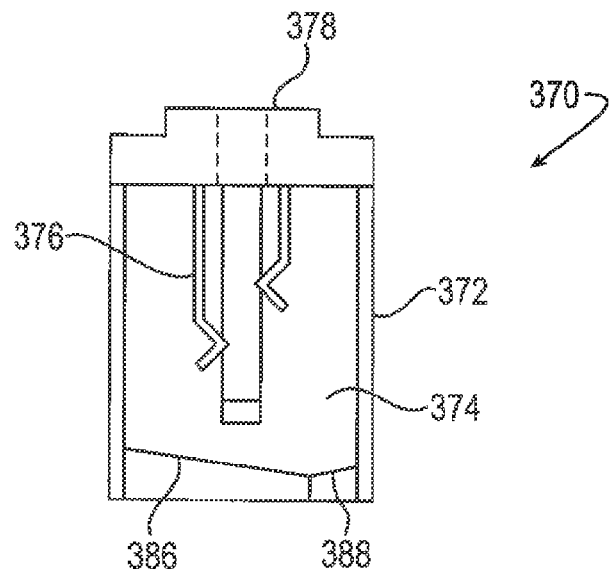
FIG. 15 is a cross sectional view of an example headphone jack configured for releasably receiving an electrical connector plug.

FIG. 15 shows a first example arrangement of a headphone jack 370 that is configured to reduce the damage that may be caused by the introduction of moisture or other contaminants into the headphone jack. Jack 370 includes a jack housing 372. Housing 372 is generally rectangular in cross section. Housing 372 bounds an interior area 374. Interior area 374 includes a plurality of electrical contacts 376. Electrical contacts 376 are configured to be releasably electrically connectable to a connector plug that can be inserted into the headphone jack through an opening 378. In the example arrangement shown, three electrical contacts 376 are positioned within the housing and are configured to contact three different areas of an electrical connector plug. These three different areas correspond to a common electrical connector and left and right audio channels, respectively, which provide outputs from the left and right earpieces of connected headphones.

Figure 16:
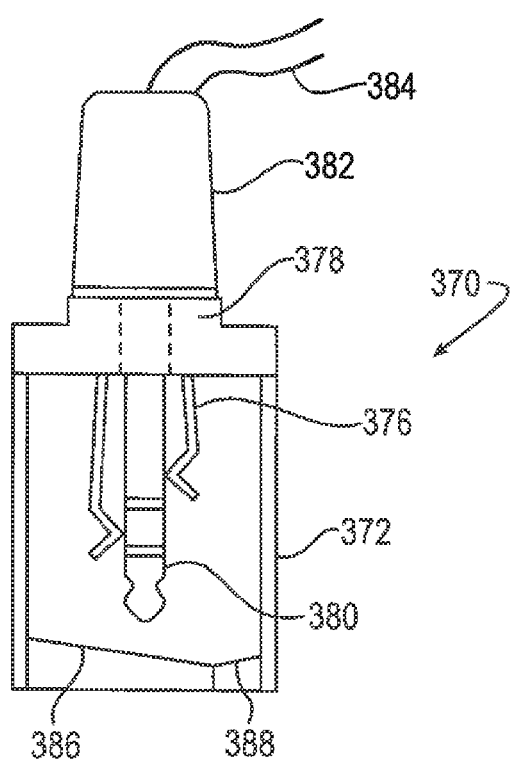
FIG. 16 is a view similar to FIG. 15 of the headphone jack with an electrical connector plug engaged therewith.

FIG. 16 shows an electrical connector plug 380 extended in the opening 378. The electrical connector plug includes a handle portion 382 which is configured to be manually engageable to facilitate the electrical connection and disconnection of the electrical connector plug and the headphone jack. The electrical connector plug is also electrically connected to a cable 384 which is connected to headphones or other portable audio output device. The example headphone jack 370 has the interior area 374 thereof bounded at its lower end by a floor surface 386. The floor surface 386 of the example embodiment includes two drain openings 388 therein. In the example embodiment the drain openings 388 are positioned vertically below the electrical contacts in the interior area of the housing. The floor surface 386 is configured to direct water that may enter the housing to the drain openings. As will explained in greater detail infra, the drain openings enable moisture that may enter the housing 372 of the headphone jack to pass therethrough without accumulating therein to cause corrosion of the contacts or otherwise cause damage that might prevent the headphone jack from operating.

Figure 17:
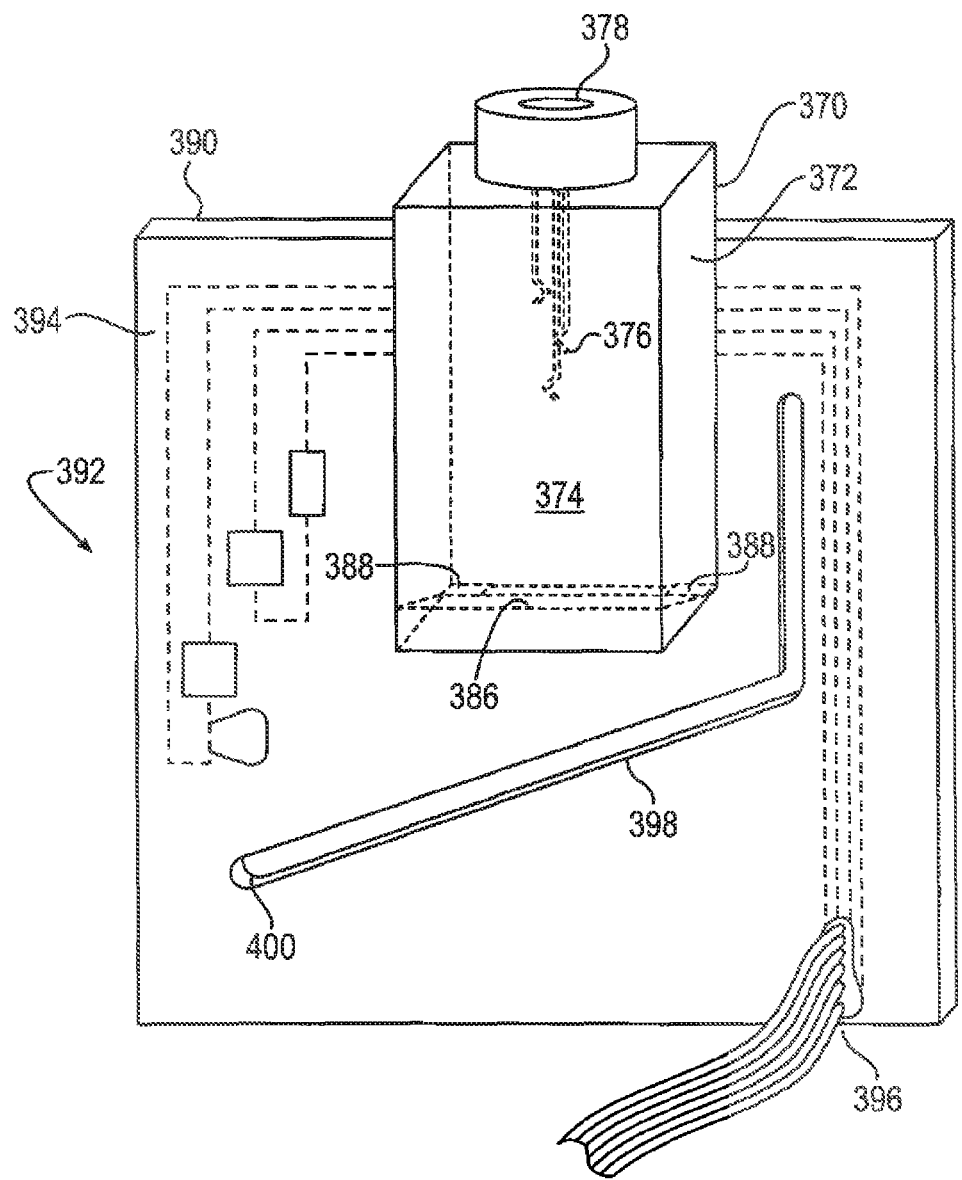
FIG. 17 is an isometric view of a headphone jack mounted on an example circuit card.

FIG. 17 shows the example headphone jack 370 attached in fixed relation to a circuit card 390. The circuit card 390 includes electrical components which may include, for example, resistors, capacitors, integrated circuits, diodes or other suitable electrical components that are necessary for the operation of the circuitry associated with the headphone jack 370. These electrical components are represented by components 392 shown schematically in FIG. 17. The circuit card 390 also includes a plurality of electrical traces 394 thereon. Traces 394 provide operable electrical connection between electrical components including the various components 392 as well as the electrical contacts 376 of the headphone jack. In the example arrangement the traces 394 also are in operable connection with an electrical component which includes a wiring connector 396 which electrically connects a plurality of wires to the circuit card. The wiring connector 396 and the wires associated therewith are operable to connect the circuit card 390 to other circuitry and devices in the machine that are associated with providing the electrical signals that correspond to audio information that is delivered through the headphone jack 370 to headphones of the user.

Figure 18:
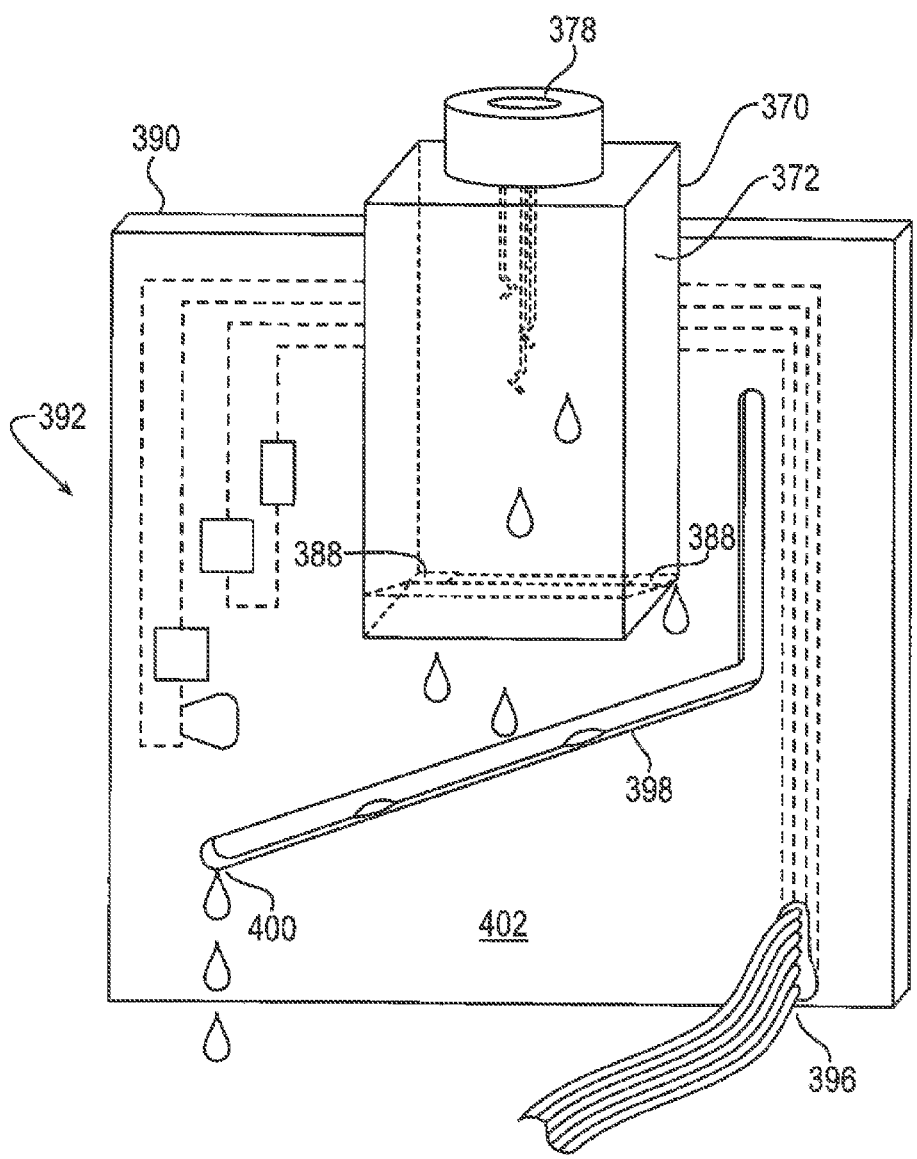
FIG. 18 is an isometric view similar to FIG. 17 representing the water flow management capabilities of the example card and headphone jack arrangement.

The example circuit card 390 includes a trough 398. Trough 398 extends vertically below the drain openings 388 of housing 372. The trough 398 is operable to engage and direct water droplets which pass out of the drain openings 388 in the housing 372 and direct the water to an outlet end 400 of the trough. This is represented in FIG. 18. In the example arrangement the trough 398 includes an elongated opening. The elongated opening extends vertically adjacent to the housing 372 and angularly downward below the drain openings 388. In the example arrangement the outlet end 400 is configured so that the water may exit from the trough on a desired planar side of the circuit card. For example, the configuration of the elongated opening may be such that the outlet end is tapered so that water leaves the trough 398 on a planar side of the card opposite from the planar side on which the jack housing is mounted. Further in the example embodiment the electrical component, which in this example is a wiring connector 396, is positioned below the elongated opening but disposed from the outlet end 400 where water is discharged from the trough. This is useful in the example arrangement because the water is directed away from the wiring connector which might otherwise corrode or be damaged by the presence of water.

While in the example arrangement the trough 398 includes a elongated opening, in other arrangements other suitable configurations for the trough may be used. For example in some arrangements the trough may include a recess that extends partially through the card. Such a recess may include bounding edges that serve to guide water therein to a desired outlet end. In other alternative arrangements the trough may include a projection that extends outward from the planar side 402 of the circuit card 390. Further in other arrangements a combination of projections, openings, recesses, tapered surfaces and other features that can catch and/or direct water may comprise the trough for directing water in a desired manner from the outlet openings to a desired point or area at which the water can safely drain. Of course it should be understood that the particular configuration used will depend on the headphone jack configuration as well as the circuit card and the electrical components thereon which may need to be protected from moisture which can enter the housing of the ATM through the opening 378 associated with the headphone jack.

Figure 19:
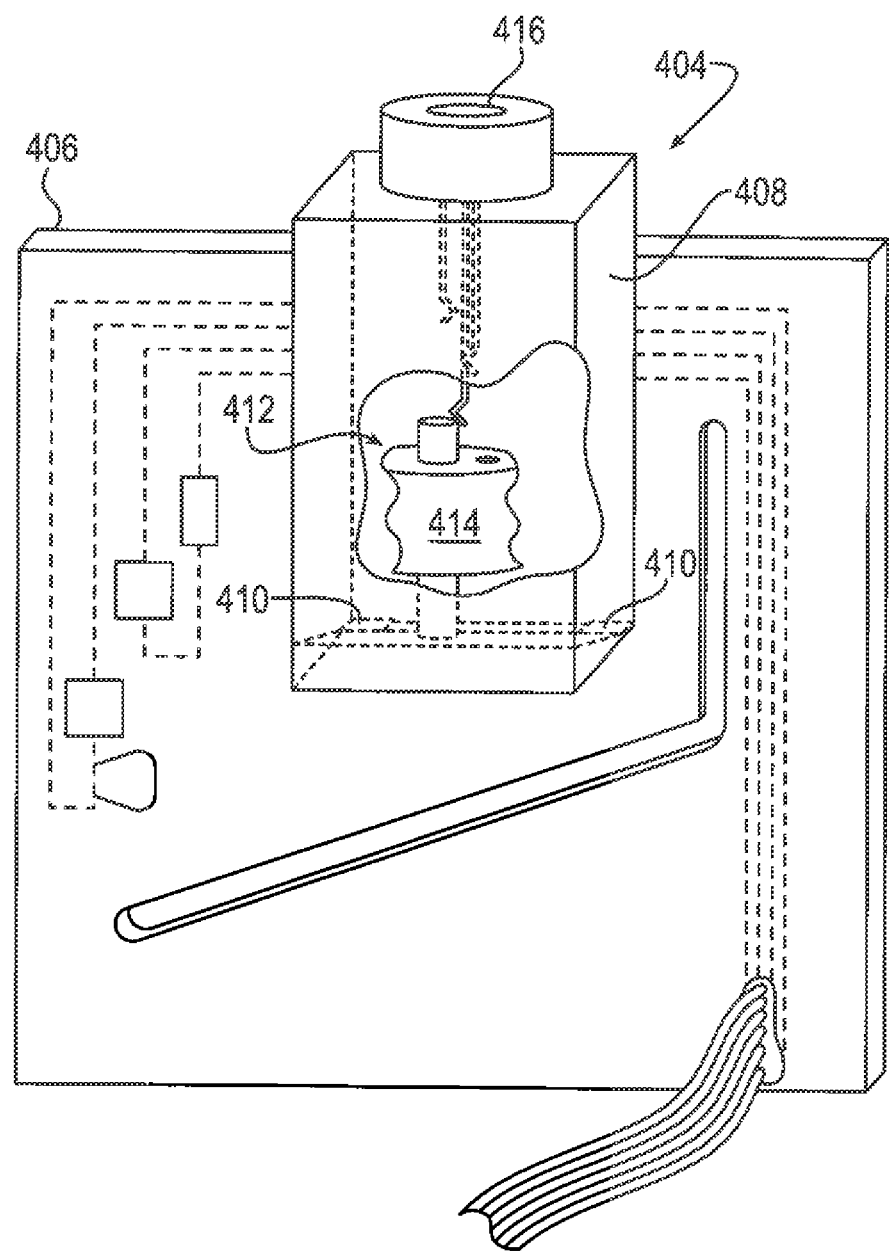
FIG. 19 is an isometric view of an alternative headphone jack and circuit card arrangement that includes an air flow device in association with the headphone jack.

FIG. 19 shows an alternative example arrangement of a headphone jack 404 that is mounted in a fixed connection with a circuit card 406. This alternative form of the headphone jack and circuit card are generally similar to headphone jack 370 and circuit card 390 previously described except as mentioned herein infra.

Headphone jack 404 includes a housing 408. Housing 408 includes drain openings 410. Housing 408 has therein an air flow device 412. Air flow device 412 operates to cause air to flow from the interior area of the housing 408 through the drain openings 410. The example arrangement of the air flow device 412 includes bellows 414. The bellows 414 is configured to be coupled with an inward end of an electrical connector plug when such a plug has been fully inserted in the opening 416. In the example arrangement the movement of the electrical connector plug in the interior area of the housing causes the air flow device 412 to output air therefrom. Because the electrical connector plug in such position substantially blocks opening 416, the air expelled from the air flow device passes outward from the interior of housing 408 through the drain openings 410.

As can be appreciated this outwardly directed air flow helps to expel moisture and also tends to keep the drain openings 410 open and not blocked by dust, dirt or other contaminants. Of course it should be understood that the example air flow device which includes bellows is merely example of many air flow devices that may be used. In other arrangements other types of devices that can provide air flow within the interior area of the housing to keep drain openings clear and otherwise help expel moisture, can be used. Further in still other arrangements air flow may be caused at least in part responsive to an electrical connector plug being positioned in the interior area of the housing. This may be done through other types of mechanical or electrical devices that engage or sense such an electrical connector plug. Further other arrangements may provide for air flow continuously or at other times than when the electrical connector plug is extended into the housing. Further alternative air supplies including compressors, fans, compressed air canisters, pistons or the like may be utilized to provide such air flow. Further in some alternative arrangements air flow devices may operate to cause flow inwardly into the headphone jack housing through the drain openings rather than outwardly. This may be done depending on the configuration of the particular housing and the ability to maintain drains open using air flow in the inward direction.

FIGS. 20 and 21 show a further alternative arrangement of a headphone jack 418. Headphone jack 418 is similar in most respects to the headphone jacks previously described except as explicitly mentioned. Headphone jack 418 includes a body 420 which houses electrical contacts 422 therein. The headphone jack includes an opening 424 at a first end that is configured to receive an electrical connector plug therein. At least one drain opening 426 extends through an area of the housing opposed of the opening 424.

Headphone jack 418 includes a flexible resilient cover 428. The example flexible resilient cover 428 is a generally circular cover that overlies an upper annular portion of body 420 above the opening 424. The cover 428 includes at least one central entry slot therethrough generally indicated 430. In the example embodiment the entry slot 430 includes a plurality of cuts that extend through the resilient member to define a plurality of flaps 432. In the example embodiment the number of cuts through the resilient cover 428 includes two centrally intersecting cuts that define four resilient flaps 432. Of course it should be understood that in other arrangements different numbers and configurations can be used for the entry slot.

In the example embodiment as shown in FIG. 20, the flaps 432 are configured in the un-deformed position when no electrical connector plug is engaged with the headphone jack, to extend outwardly away from the opening 424. In this condition the flaps define an outwardly extending apex generally indicated 434. The apex 434 formed by the flaps 432 of an example embodiment serve to direct water and contaminants away from the entry slot 430. Thus if water, snow or other elements land on the flexible resilient cover 428 such contaminants will tend to be directed away from the entry slot 430 by the outwardly extending apex 434. In addition because in the example arrangement the entry slot 430 is generally closed when no electrical connector plug is present, the introduction of moisture and contaminants into the interior area of the housing 420 is minimized.

FIG. 21 shows a condition where an electrical connector plug 436 is engaged with the headphone jack. In this condition the flaps 432 of the flexible resilient cover 428 are deformed inwardly and toward the opening 424. This enables the plug 436 to extend through the entry slot 430 and engage the electrical contacts 422 within the housing. As can be appreciated in this example embodiment because the entry slot 430 is open only when an electrical connector plug is extended therethrough, the amount of moisture that can enter the interior area of the housing is minimized. In addition the inward deformation of the flexible resilient cover 428 also provides a pressure force and air flow upon insertion of the plug that helps to keep open the drain openings.

In this example arrangement removal of the electrical connector plug causes the flexible resilient cover 428 to return to the position shown in FIG. 20. As the resilient cover returns to this position, dirt and other contaminants that may have been loose on the electrical connector plug are generally wiped off by the flaps 432 and moved external of the housing as the flaps return to form the apex 434. This further helps to keep dirt and other contaminants outside of the interior area of the housing 420. Of course it should be understood that this configuration is an example and in other example arrangements the principles described may be used to accomplish the functions of minimizing the introduction of moisture and other contaminants into the headphone jack.

Figure 22:
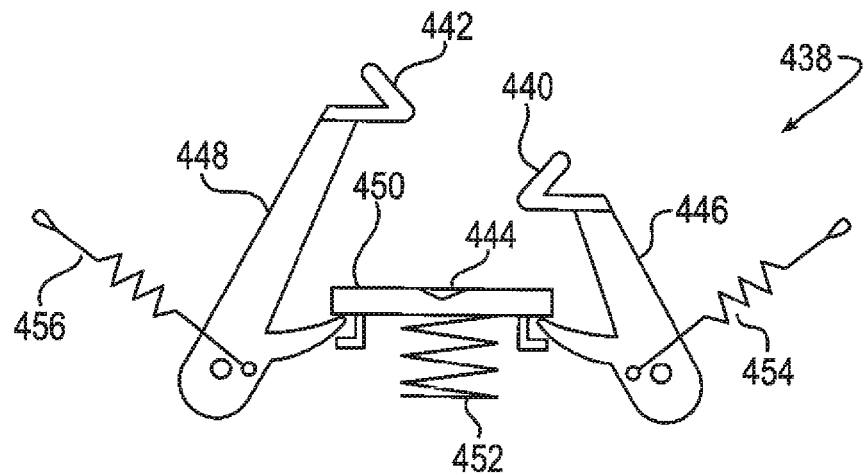
FIG. 22 is a schematic view of an arrangement of electrical contacts for use in connection with a headphone jack that can provide enhanced electrical contact with an electrical connector plug.
Figure 23:
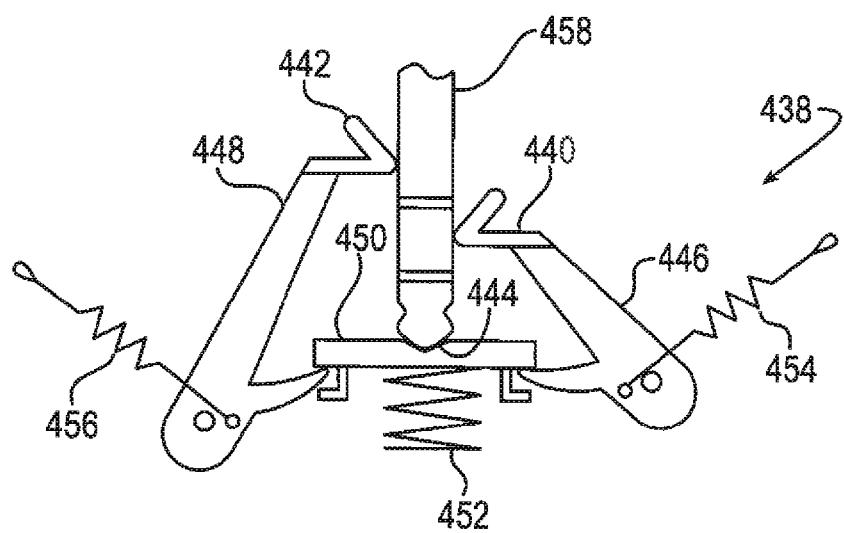
FIG. 23 is a view similar to FIG. 22 showing an electrical connector plug in operable connection with the electrical contacts.

FIGS. 22 and 23 show schematically another alternative example of an arrangement for a headphone jack 438. Headphone jack 438 includes an arrangement for electrical contacts 440, 442 and 444 that are configured for providing a clamping force on an electrical connector plug that is inserted in the headphone jack.

In the example arrangement electrical contacts 440 and 442 are mounted on spring biased levers 446 and 448 respectively. Electrical contact 444 is positioned on a movable target 450. Target 450 is in coupled with a spring 452 that biases the target 450 generally upward as shown in FIG. 22. Springs 454 and 456 respectively bias levers 446 and 448 so that contacts 440 and 442 are disposed away from the central portion of the jack where an electrical connector plug may extend upon insertion when the target 450 is biased to the position shown. As represented in FIG. 23, when an electrical connector plug 458 is inserted into the headphone jack 438, the target 450 is moved by engagement with the plug against the biasing force of spring 452. The movement of the target 450 causes the movement of the levers 446 and 448 to move radially inward relative to the connector plug 458. This causes a biasing force through each of the electrical contacts 440, 442 and 444 against a respective portion of the electrical connector plug. This biasing force that is applied responsive to engagement of the target by the cylindrical plug body provides additional contact force that is applied by the electrical contacts against the electrical connector plug. This helps to facilitate solid electrical engagement with the plug to assure clear and complete connections to the headphones or other portable audio output device that is engaged through the electrical connector plug.

As can be appreciated from the configuration of the target 450 and the levers 446 and 448, removal of the electrical connector plug 458 causes the target to move responsive to the biasing force of the spring 452. This causes movement of levers 446 and 450 in over center relation of the pivot points of the respective levers so that springs 454 and 456 again cause the levers to retract radially away from the area where the electrical plug body extends in the interior of the jack.

The example arrangement is useful in situations where dirt, or contaminants or other items that might otherwise impede electrical connections may be present on the electrical contacts and that might otherwise cause lack of electrical connection or an incomplete or intermittent connection when the electrical connector plug is inserted. Such arrangements might also be used in an electrical connector jack that includes a flowable type material that is included within the housing that bounds the jack to prevent contaminants that might enter the housing from reaching the electrical contacts. For example in some arrangements such flowable filler material may include non-conductive small spheres or other bodies that fill the area where the electrical contacts are present but which enable plug insertion and electrical contact by movement the filler material. In other arrangements the filler material may include non-conductive gels or other materials that can fill the housing interior to prevent contaminants that might enter the jack housing, from reaching the electrical contacts. The spring force that is applied by the electrical contacts to the plug enables the non-conductive materials to be squeezed out from the areas where electrical contact is to be made between the electrical connector plug and the electrical contacts. This may enable a firm electrical engagement despite the presence of the material which otherwise fills the cavity. Of course it should be understood that these approaches are example and in other arrangements other approaches may be used. In addition, the example arrangement shown in FIGS. 22 and 23 may be used with features shown in other example embodiments to provide a more reliable and weather resistant electrical connection to portable wireless devices. Thus, the automated banking machine apparatus audible user interface system and method of example embodiments achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Apparatus comprising:
an automated banking machine that operates to cause financial transfers, the machine includes:
a reader operable to obtain data corresponding to financial accounts,
a display,
an input device,
a sheet handling device,
wherein the sheet handling device is operable to one of a group consisting of dispense sheets to machine users, receive sheets from machine users, and both dispense sheets to machine users and receive sheets from machine users,
a computer associated with the machine,
wherein the computer is operable to cause a determination that data read by the reader corresponds to an account authorized to conduct a transaction through operation of the automated banking machine, and
wherein the computer is operable to cause a financial transfer from one of a group consisting of to the account, from the account, and both to the account and from the account responsive at least in part to the determination that data read by the card reader corresponds to an account authorized to conduct a transaction through operation of the automated banking machine,
an externally accessible headphone jack that is configured to be releasibly, electrically connectable to portable audio output devices,
wherein the headphone jack includes an opening external of the machine,
wherein the opening is configured to receive electrical connector plugs therein,
a jack housing within the machine, wherein the jack housing extends below the opening and bounds an interior area, wherein the interior area houses at least one electrical contact configured for releasible electrical connection with electrical connector plugs,
wherein the jack housing includes a drain opening therein below the at least one electrical contact, and
wherein the drain opening is configured to drain water from the interior area of the jack housing;
wherein the jack housing includes an air flow device operable to engage an electrical connector plug when fully inserted into the opening;
wherein engagement with the electrical connector plug causes the air flow device to expel air; and
wherein air expelled from the airflow device passes outwardly from the interior of the jack housing through the drain opening.

2. The apparatus according to claim 1, wherein the interior area is bounded at an end disposed away from the opening by a floor surface, wherein the floor surface is configured to direct water by gravity toward the drain opening.

3. The apparatus according to claim 2, wherein the jack housing is generally rectangular in cross section,
    wherein the jack housing includes four lower corners, and
    wherein a drain opening extends through at least two of the lower corners of the housing.

4. The apparatus according to claim 2, and further comprising a circuit card,
    wherein the jack housing is in a fixed connection with the circuit card,
    wherein the circuit card includes a trough in operable connection therewith wherein the trough extends vertically below the drain opening.

5. The apparatus according to claim 4, wherein the trough includes a recess in the circuit card.

6. The apparatus according to claim 4, wherein the trough includes an outward projection from a planar surface of the circuit card.

7. The apparatus according to claim 4, wherein the trough includes an elongated opening,
    wherein the elongated opening terminates at an outlet end, and
    wherein the outlet end is at a vertically lowest portion of the elongated opening.

8. The apparatus according to claim 7, further including a flexible resilient cover in overlying relation of the opening,
    wherein the cover includes an entry slot therethrough, and
    wherein the entry slot enables insertion of electrical connector plugs into the opening.

9. The apparatus according to claim 8, wherein the entry slot defines a plurality of resilient flaps, wherein the plurality of flaps generally cover the opening when the electrical connector plug is not extended therein.

10. The apparatus according to claim 9, wherein when an electrical connector plug is not positioned in the opening, the plurality of flaps define an outward extending apex, and
    wherein the apex generally overlies the opening.

11. The apparatus according to claim 1, wherein the air flow device includes a bellows.

12. The apparatus according to claim 1, further including a movable target, that is movably mounted within the interior area of the housing,
    wherein the target is movable responsive to operable engagement with an electrical connector plug in the interior area, and
    wherein at least one of the at least one electrical contacts is moved into biasing engagement with the electrical connector plug responsive at least in part to movement of the target.

13. The apparatus according to claim 12, wherein the electrical connector plug includes a cylindrical plug body, and
    wherein the at least one electrical contact is caused to move radially inward relative to the plug body responsive at least in part to movement of the target.

14. The apparatus according to claim 1 and further including a movable target that is movably mounted within the interior area of the housing,
    wherein the target is movable responsive to operable engagement with an electrical connector plug in the interior area, wherein at least one of the at least one electrical contact is moved into biasing engagement with the electrical connector plug responsive at least in part to movement of the target.

15. The apparatus according to claim 1, further comprising a flexible resilient cover in overlying relation of the opening,
    wherein the cover includes an entry slot therethrough, and
    wherein the entry slot enables insertion of electrical connector plugs into the opening.

16. The apparatus according to claim 15, wherein the entry slot defines a plurality of resilient flaps, and wherein the plurality of flaps generally cover the opening when an electrical connector plug is not extended therein.

17. The apparatus according to claim 16, wherein when an electrical connector plug is not positioned in the opening, the plurality of flaps define an outward extending apex, wherein the apex generally overlies the opening.

* * * * *